(12) United States Patent
Yuhara et al.

(10) Patent No.: US 9,310,194 B2
(45) Date of Patent: Apr. 12, 2016

(54) POSITION DETECTION DEVICE AND POSITION DETECTION METHOD

(75) Inventors: Hiroshi Yuhara, Yokohama (JP); Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 224 days.

(21) Appl. No.: 14/009,278

(22) PCT Filed: Apr. 6, 2012

(86) PCT No.: PCT/JP2012/059466
§ 371 (c)(1),
(2), (4) Date: Oct. 1, 2013

(87) PCT Pub. No.: WO2012/137902
PCT Pub. Date: Oct. 11, 2012

(65) Prior Publication Data
US 2014/0059875 A1    Mar. 6, 2014

(30) Foreign Application Priority Data

Apr. 7, 2011 (JP) ................................. 2011-085731
Mar. 23, 2012 (JP) ................................. 2012-067805

(51) Int. Cl.
*G01B 5/25* (2006.01)
*G01B 21/16* (2006.01)
(Continued)

(52) U.S. Cl.
CPC ................ *G01B 21/16* (2013.01); *B29C 65/18* (2013.01); *B29C 65/7847* (2013.01);
(Continued)

(58) Field of Classification Search
CPC ............ G01B 5/14; G01B 5/25; G01B 11/26; G01B 11/27
USPC .................................................. 33/613, 645
See application file for complete search history.

(56) References Cited

U.S. PATENT DOCUMENTS 6,534,952 B1    3/2003 Ishikawa et al.
2003/0090662 A1*  5/2003 Yamamoto .................... 356/401
(Continued)

FOREIGN PATENT DOCUMENTS

CN    1367683 A    12/2002
EP    1 249 884 A1    10/2002
(Continued)

OTHER PUBLICATIONS

Supplementary European Search Report dated Sep. 12, 2014, 8 pgs.
(Continued)

*Primary Examiner* — G. Bradley Bennett
(74) *Attorney, Agent, or Firm* — Foley & Lardner LLP

(57) ABSTRACT

The present invention provides a position detection device and a position detection method, which, even if a separator or an electrode is deformed, are capable of correcting such deformation and detecting a position of the separator or the electrode with high precision, and are capable of enhancing precision in subsequent steps. The position detection device (200) includes: a pressing unit (240) that presses a sheet member (22), which is cut out from a sheet material (D) wound up in a roll shape and composes a battery element, against a flat reference surface (215); and a position detection unit (230) that detects a position of the sheet member (22) pressed against the reference surface (215) by the pressing unit (240). Then, the position of the sheet member (22), which is detected by the position detection unit (230), is used as position information of the sheet member (22) in a subsequent step.

13 Claims, 19 Drawing Sheets

(51) Int. Cl.

| | | |
|---|---|---|
| *H01M 10/04* | (2006.01) | |
| *B29C 65/18* | (2006.01) | |
| *B29C 65/78* | (2006.01) | |
| *B29C 65/00* | (2006.01) | |
| *B29C 65/80* | (2006.01) | |
| *H01M 10/0525* | (2010.01) | |
| *H01M 10/0585* | (2010.01) | |
| *B29L 31/34* | (2006.01) | |
| *B29C 65/48* | (2006.01) | |
| *B29C 65/56* | (2006.01) | |

(52) U.S. Cl.
CPC ............ *B29C 65/80* (2013.01); *B29C 66/1122* (2013.01); *B29C 66/21* (2013.01); *B29C 66/433* (2013.01); *B29C 66/81429* (2013.01); *B29C 66/83543* (2013.01); *H01M 10/0404* (2013.01); *H01M 10/0463* (2013.01); *B29C 65/48* (2013.01); *B29C 65/56* (2013.01); *B29L 2031/3468* (2013.01); *H01M 10/0525* (2013.01); *H01M 10/0585* (2013.01); *Y02E 60/122* (2013.01); *Y02P 70/54* (2015.11)

(56) References Cited

U.S. PATENT DOCUMENTS

| | | | |
|---|---|---|---|
| 2004/0191634 A1 | 9/2004 | Yanagawa et al. | |
| 2009/0116013 A1* | 5/2009 | Tom et al. | 356/399 |
| 2009/0253038 A1 | 10/2009 | Segawa et al. | |
| 2011/0131799 A1 | 6/2011 | Ito et al. | |
| 2012/0132697 A1* | 5/2012 | Yano et al. | 228/212 |
| 2014/0020237 A1* | 1/2014 | Yuhara et al. | 29/623.1 |
| 2014/0026398 A1* | 1/2014 | Watanabe et al. | 29/623.1 |
| 2014/0111797 A1* | 4/2014 | Kitamura et al. | 356/138 |
| 2014/0175269 A1* | 6/2014 | Kobayashi et al. | 250/227.14 |

FOREIGN PATENT DOCUMENTS

| | | |
|---|---|---|
| EP | 2 458 669 A2 | 5/2012 |
| JP | 11-339841 A | 12/1999 |
| JP | 2001-189326 A | 7/2001 |
| JP | 2010-257861 A | 11/2010 |
| JP | 2012-113994 A | 6/2012 |
| KR | 10-0421350 B1 | 3/2004 |
| TW | 200629 | 2/1993 |
| WO | WO 2010/026784 A1 | 3/2010 |

OTHER PUBLICATIONS

Office Action issued in Korean Patent Application No. 10-2013-7028554 issued Feb. 24, 2015.
Taiwanese Office Action dated Jan. 6, 2014, (4 pgs.).

* cited by examiner

FIG. 3
(A)
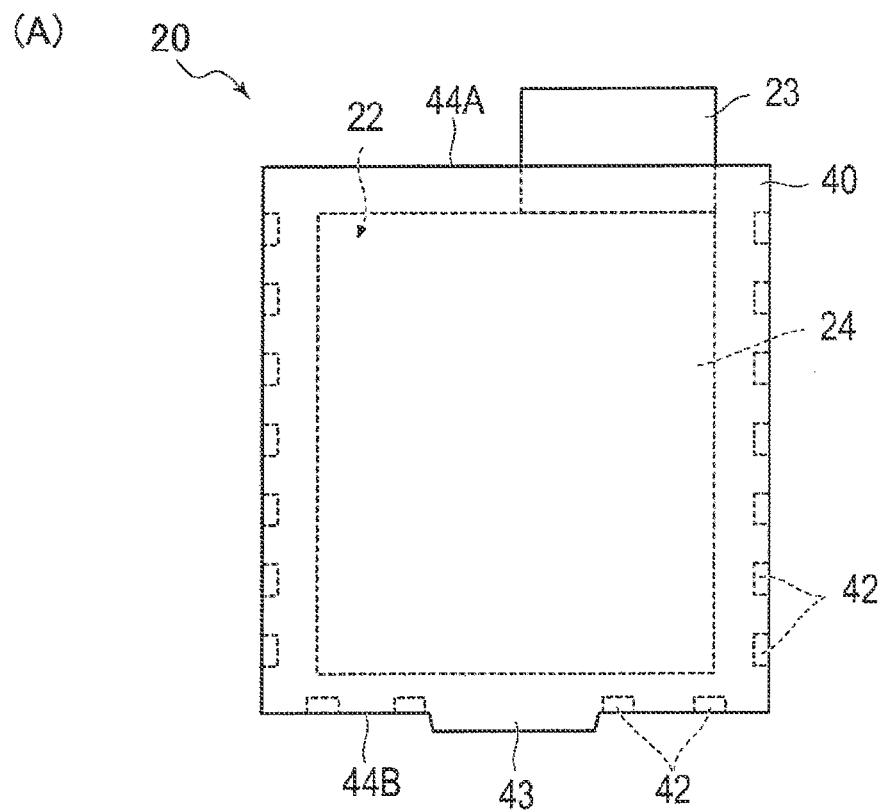
(B)
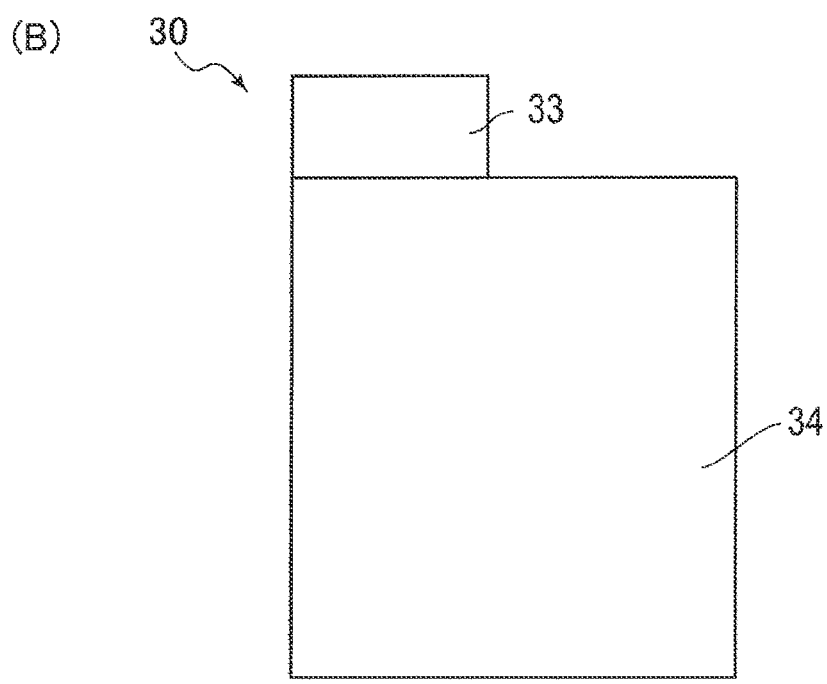

POSITION DETECTION DEVICE AND POSITION DETECTION METHOD

TECHNICAL FIELD

The present invention relates to a position detection device and a position detection method.

BACKGROUND ART

In recent years, in a variety of batteries such as an automotive battery, a solar cell and a battery for an electronic instrument, stacked batteries have been used. Each of the stacked batteries is configured in such a manner that a positive electrode, a negative electrode and separators are formed into a sheet shape, and that the positive electrode, the separator, the negative electrode and the separator are alternately stacked on one another in this order. Note that the positive electrode and the negative electrode are hereinafter referred to as electrodes in some case.

As devices for use in manufacturing the stacked battery as described above, a variety of devices has been proposed. Then, as a device that conveys the electrodes, for example, a device described in Patent Literature 1 is mentioned.

The device described in Patent Literature 1 includes a conveyor provided with a suction function, and conveys each of the electrodes while sucking and holding the electrode concerned on this conveyor.

CITATION LIST

Patent Literature

Patent Literature 1: Japanese Patent Unexamined Publication No. H11-339841

SUMMARY OF INVENTION

However, each of the electrodes and the separators for the battery is formed into an extremely thin foil shape or a thin film shape, and a single body thereof is prone to be deformed. Therefore, in the event of conveying the single body of the electrodes and the separators, there is an apprehension that the electrode or the separator may be deformed by being rounded, and so on. In particular, in the case where the electrode or the separator is cut out from a sheet material wound up in a roll shape, the electrode or the separator is prone to be rounded since curl is left therein. Moreover, in the automotive battery or the like, for example, the electrode or the separator has a sheet size as large as approximately B5 to A4, and accordingly, is prone to be deformed in comparison with a battery for a cellular phone, and the like. Then, if the separator or the electrode, which is thus cut out, is deformed, then there is an apprehension that processing precision in subsequent steps may be lowered.

The present invention has been made in consideration of such problems inherent in the conventional technology. Then, it is an object of the present invention to provide a position detection device and a position detection method, which, even if the separator or the electrode is deformed, are capable of correcting such deformation and detecting a position thereof with high precision, and enhancing precision in the subsequent steps.

A position detection device according to a first aspect of the present invention includes: a pressing unit that presses a sheet member, which is cut out from a sheet material wound up in a roll shape and composes a battery element, against a flat reference surface; and a position detection unit that detects a position of the sheet member pressed against the reference surface by the pressing unit. Then, the position of the sheet member, which is detected by the position detection unit, is used as position information of the sheet member in a subsequent step.

A position detection method according to a second aspect of the present invention includes: a step of pressing a sheet member, which is cut out from a sheet material wound up in a roll shape and composes a battery element, against a flat reference surface; and a step of detecting a position of the sheet member pressed against the reference surface. Then, the detected position of the sheet member is used as position information of the sheet member in a subsequent step.

BRIEF DESCRIPTION OF DRAWINGS

FIG. 3 is a plan view showing a packaged positive electrode, and a negative electrode.

DESCRIPTION OF EMBODIMENTS

Figure 1:
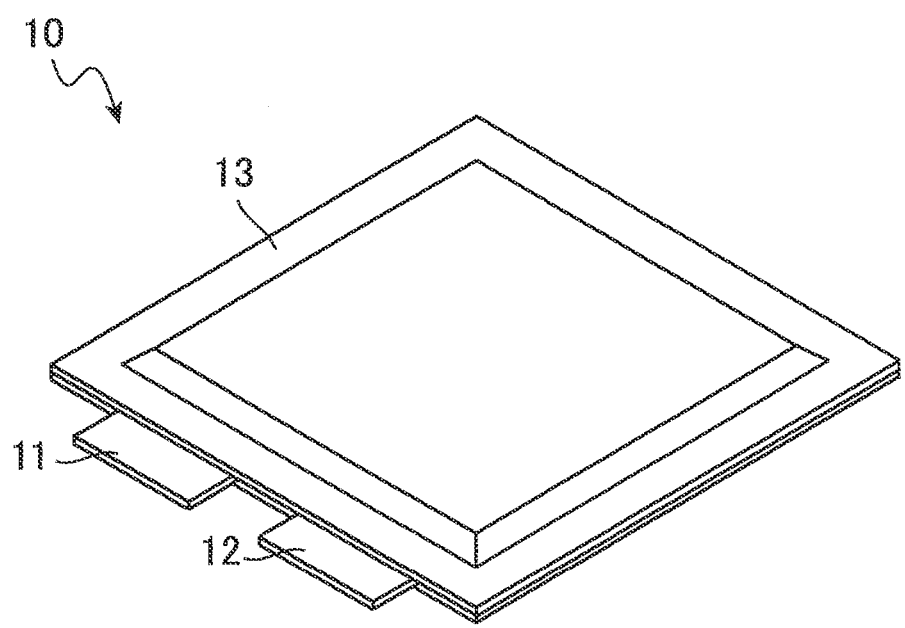
FIG. 1 is a perspective view showing an exterior appearance of a lithium ion secondary battery.

A description is made below of embodiments of the present invention with reference to the accompanying drawings. Note that dimensional ratios in the drawings are exaggerated for convenience of explanation, and are sometimes different from actual ratios.

The present invention relates to a position detection device and a position detection method for a sheet member, which are applied to a part of a manufacturing process of a battery. The position detection device according to an embodiment of the present invention composes a part of a stacking device for stacking sheet members on one another. Before describing the position detection device, a description is made of a structure of the battery and of the stacking device that assembles a power generation element thereto.

[Battery]

Figure 2:
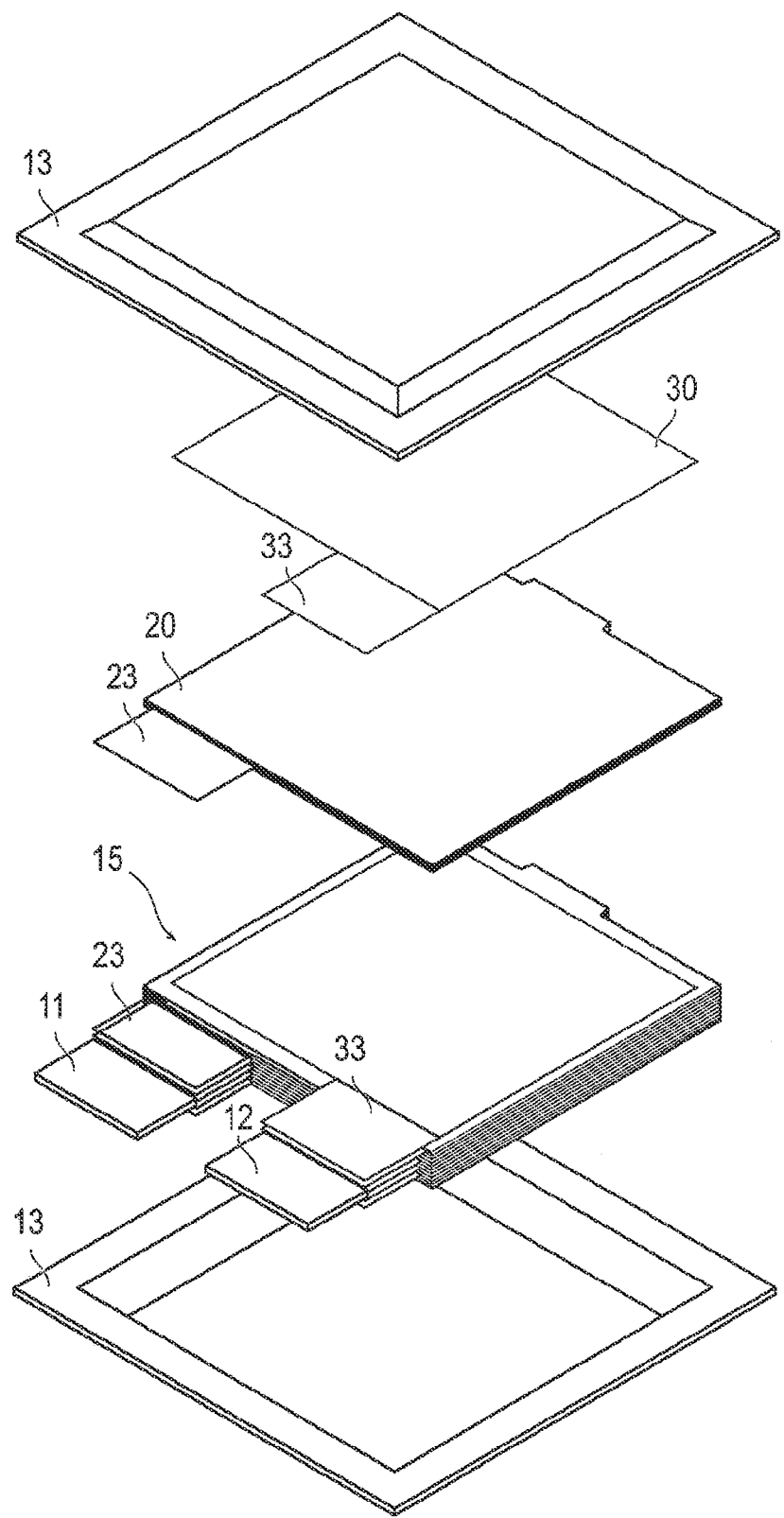
FIG. 2 is an exploded perspective view of the lithium ion secondary battery.

First, with reference to FIG. 1, a description is made of a lithium ion secondary battery (stacked battery) to be formed by the stacking device. FIG. 1 is a perspective view showing an exterior appearance of a lithium ion secondary battery, FIG. 2 is an exploded perspective view of the lithium ion secondary battery, and FIGS. 3A and 3B are plan views of a packaged positive electrode and a negative electrode.

As shown in FIG. 1, a lithium ion secondary battery 10 has a flat rectangular shape, and a positive electrode lead 11 and a negative electrode lead 12 are taken out from the same end portion of a covering material 13. Then, as shown in FIG. 2, in an inside of the covering material 13, a power generation element (battery element) 15 in which a charge/discharge reaction progresses is housed. The power generation element 15 is formed in such a manner that packaged positive electrodes 20 and negative electrodes 30 are alternately stacked on one another.

As shown in FIG. 3A, in each of the packaged positive electrodes 20, a rectangular positive electrode 22 is sandwiched by rectangular separators 40. In the positive electrode 22, positive electrode active material layers are formed on both surfaces of an extremely thin sheet-like positive electrode current collector (current collector foil). Two separators 40 are joined to each other at end portions thereof by joint portions 42, and are formed into a bag shape. In the separator 40, a positive electrode tab 23 of the positive electrode 22 is drawn out from a side 44A that is linearly formed, and further, on a side 44B opposite with the side 44A, an engagement portion 43 that partially protrudes is formed. The engagement portion 43 engages with the covering material 13 in an inside of the covering material 13, and thereby plays a role of fixing the power generation element 15 to the covering material 13. In the positive electrode 22, on a portion thereof other than the positive electrode tab 23, a positive electrode active material layer 24 is formed.

As shown in FIG. 3B, each of the negative electrodes 30 is formed into a rectangular shape, in which negative electrode active material layers 34 are formed on both surfaces of an extremely thin-sheet like negative electrode current collector (current collector foil). In the negative electrode 30, on portions other than the negative electrode tab 33, the negative electrode active material layers 34 are formed.

Figure 4:
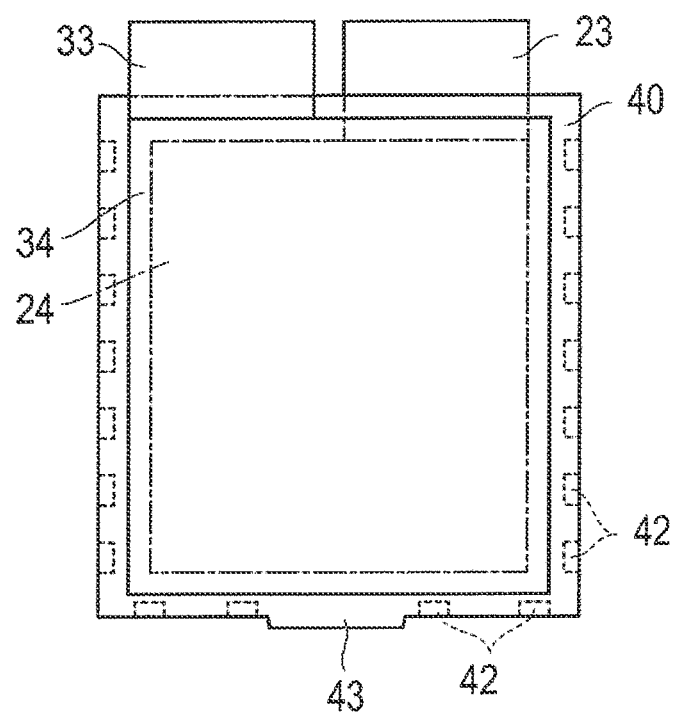
FIG. 4 is a plan view showing a state where the negative electrode is stacked on the packaged positive electrode.

When the negative electrode 30 is stacked on the packaged positive electrode 20, a shape as shown in FIG. 4 is formed. As shown in FIG. 4, when viewed from the above, the negative electrode active material layers 34 are formed larger by one size than the positive electrode active material layers 24 of the positive electrode 20.

Note that a method itself for manufacturing the lithium ion secondary battery by alternately stacking the packaged positive electrodes 20 and the negative electrodes 30 to each other is a general manufacturing method of the lithium ion secondary battery, and accordingly, a detailed description thereof is omitted.

[Stacking Device]

Next, while referring to the drawings, a description is made of a stacking device including a position detection device 200 according to the embodiment of the present invention.

Figure 5:
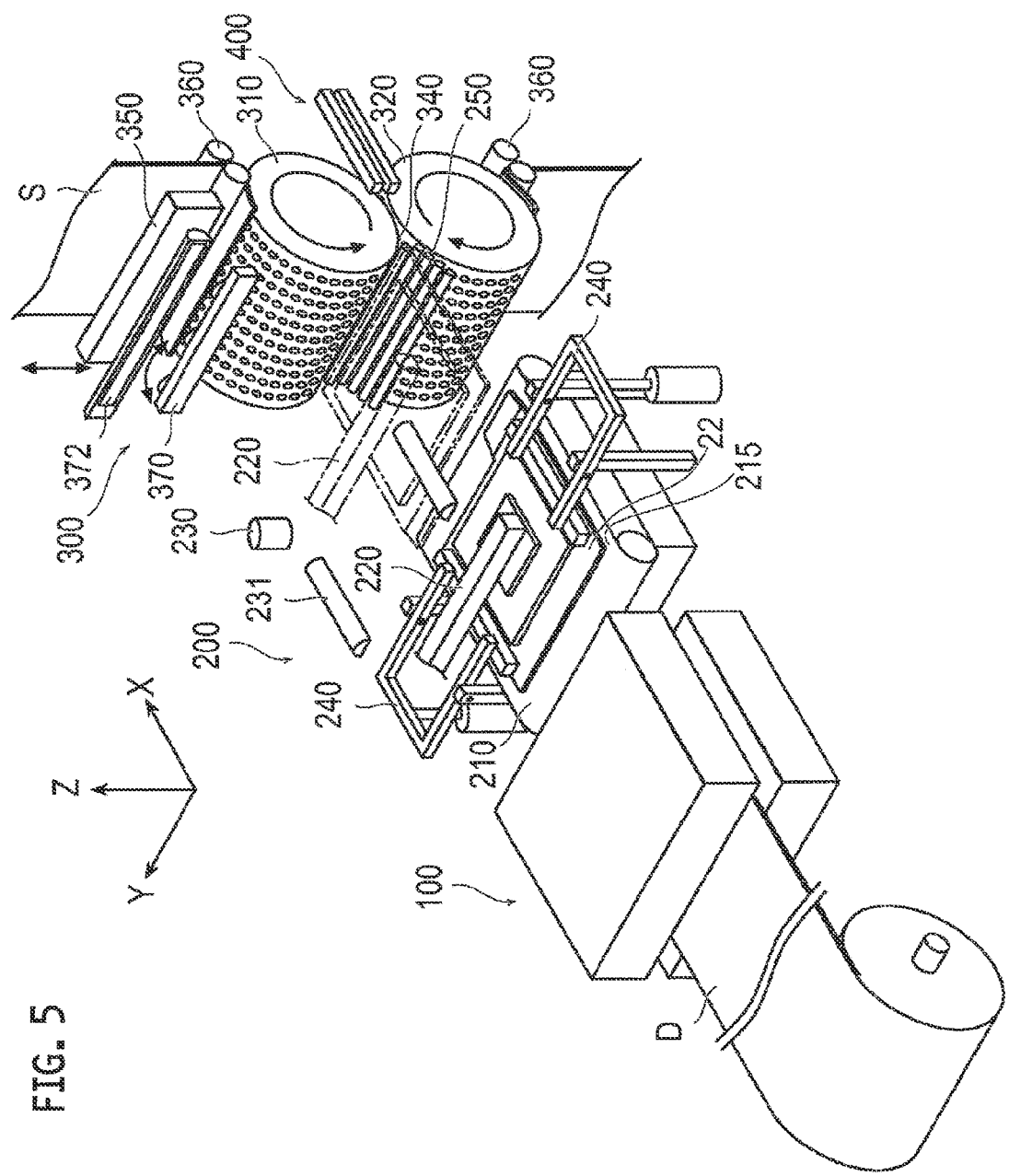
FIG. 5 is a schematic perspective view showing a stacking device.
Figure 6:
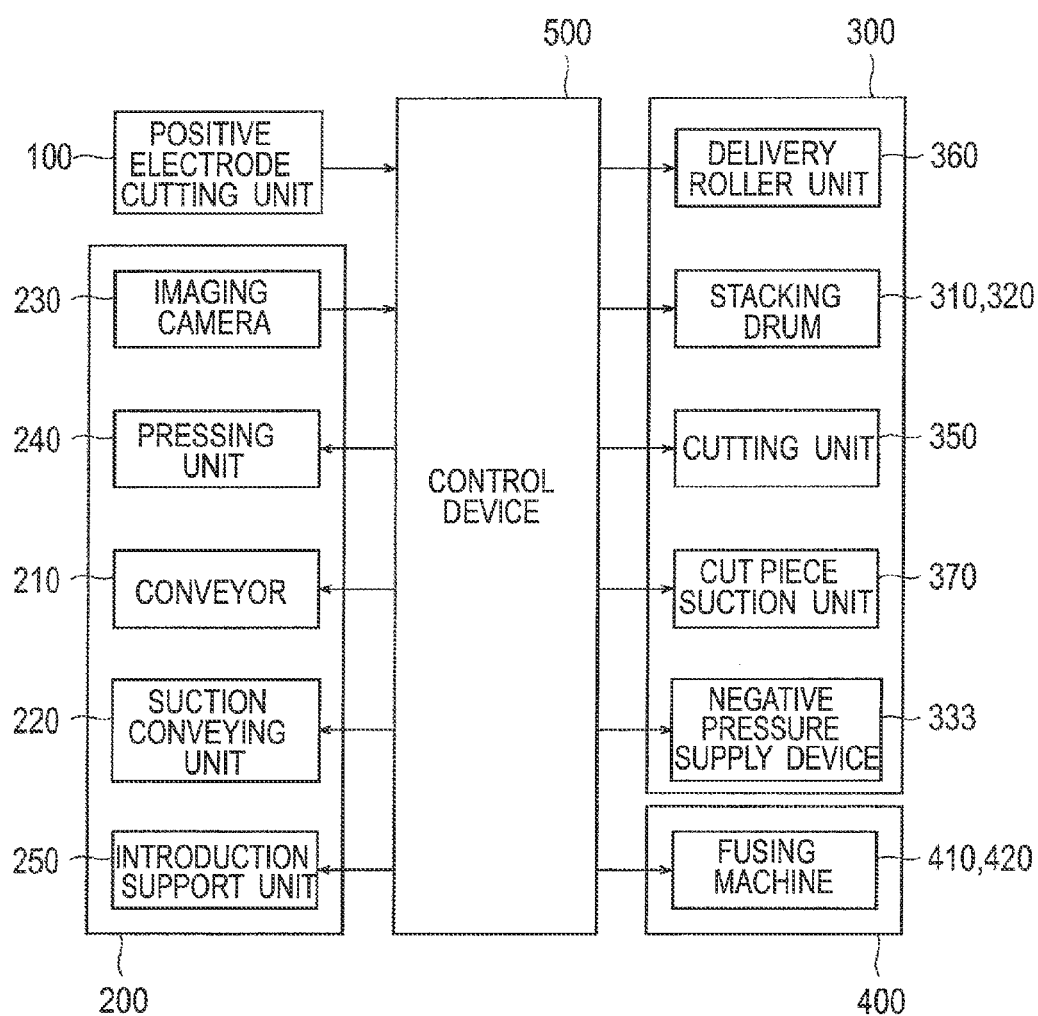
FIG. 6 is a diagram showing an electrical configuration of the stacking device.

As shown in FIG. 5 and FIG. 6, this stacking device includes: a positive electrode cutting unit 100 that cuts out the positive electrode 22 from a sheet material D for the positive electrode; and a position detection device 200 that conveys the cut out positive electrode 22 after detecting a position thereof. Moreover, the stacking device includes: a rotary conveying unit 300 provided on a downstream side of the position detection device 200 in a conveying direction; a fusing unit 400 provided on both sides of the rotary conveying unit 300; and a control device 500 (control unit) that controls the whole of the device in a centralized manner. In this embodiment, the description is made on the assumption that a direction where the positive electrode 22 is conveyed is a conveying direction X, that a direction perpendicular to a surface of the positive electrode 22 is a vertical direction Z, and a direction perpendicular to the vertical direction Z and the conveying direction X is a width direction Y.

The positive electrode cutting unit 100 is a unit, which cuts the sheet material D for the positive electrode, which is wound up in a roll shape, into a predetermined shape by punching processing and the like, and thereby cuts out the positive electrode 22 (sheet member) with a predetermined shape. The positive electrode 22 thus cut out is rectangular, and has the positive electrode tab 23.

Figure 7:
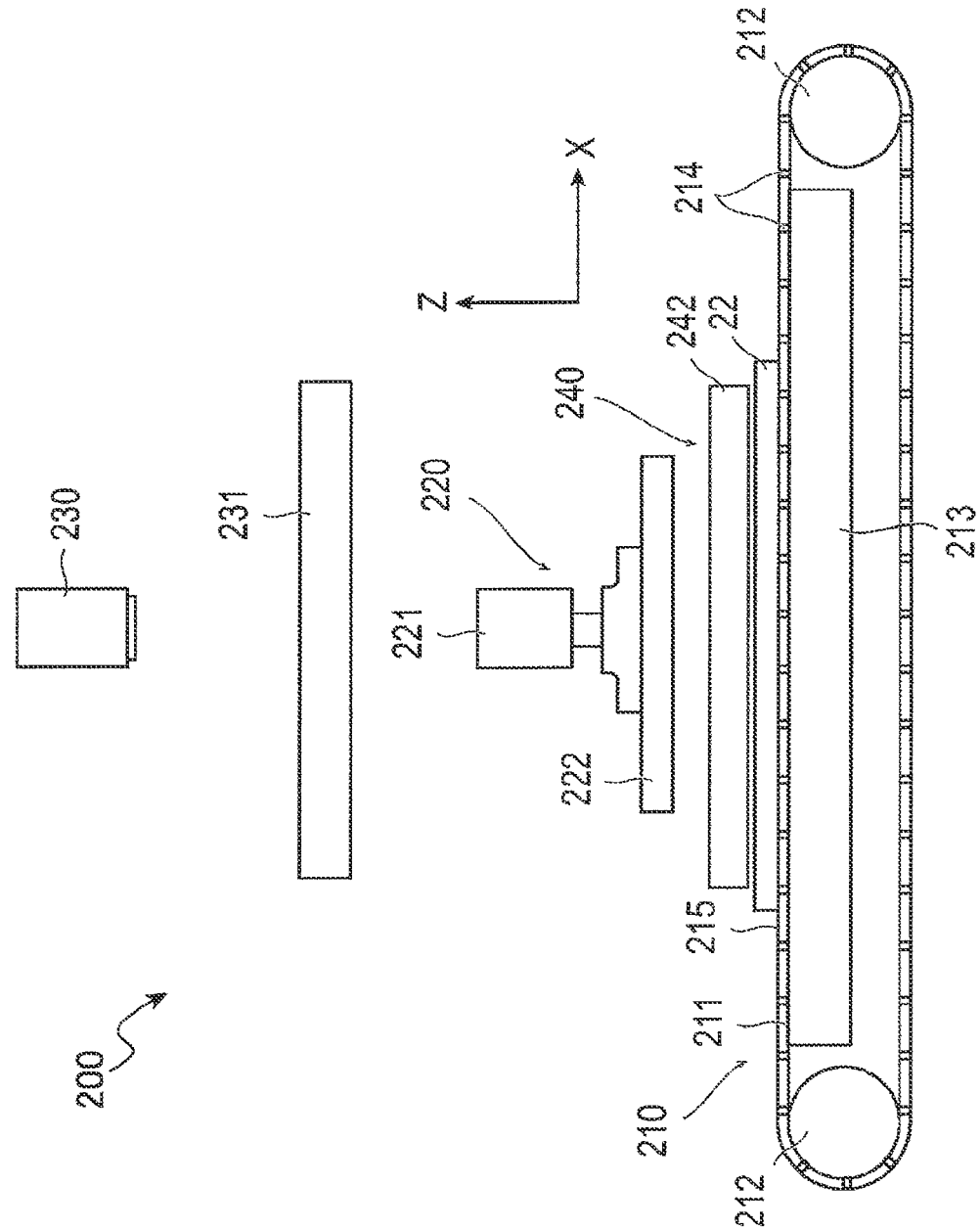
FIG. 7 is a side view showing a position detection device provided in the stacking device.
Figure 8:
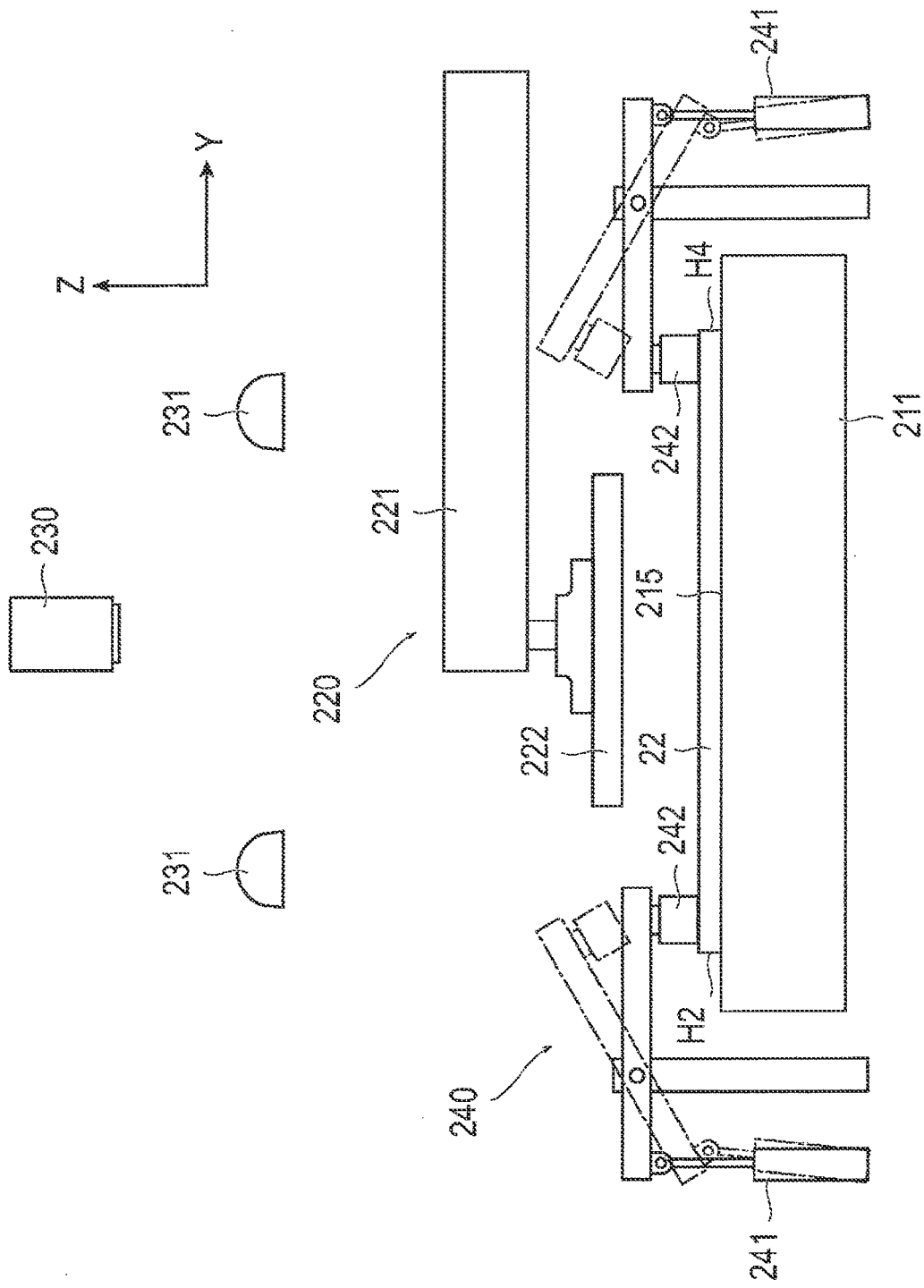
FIG. 8 is a front view showing the position detection device provided in the stacking device.
Figure 9:
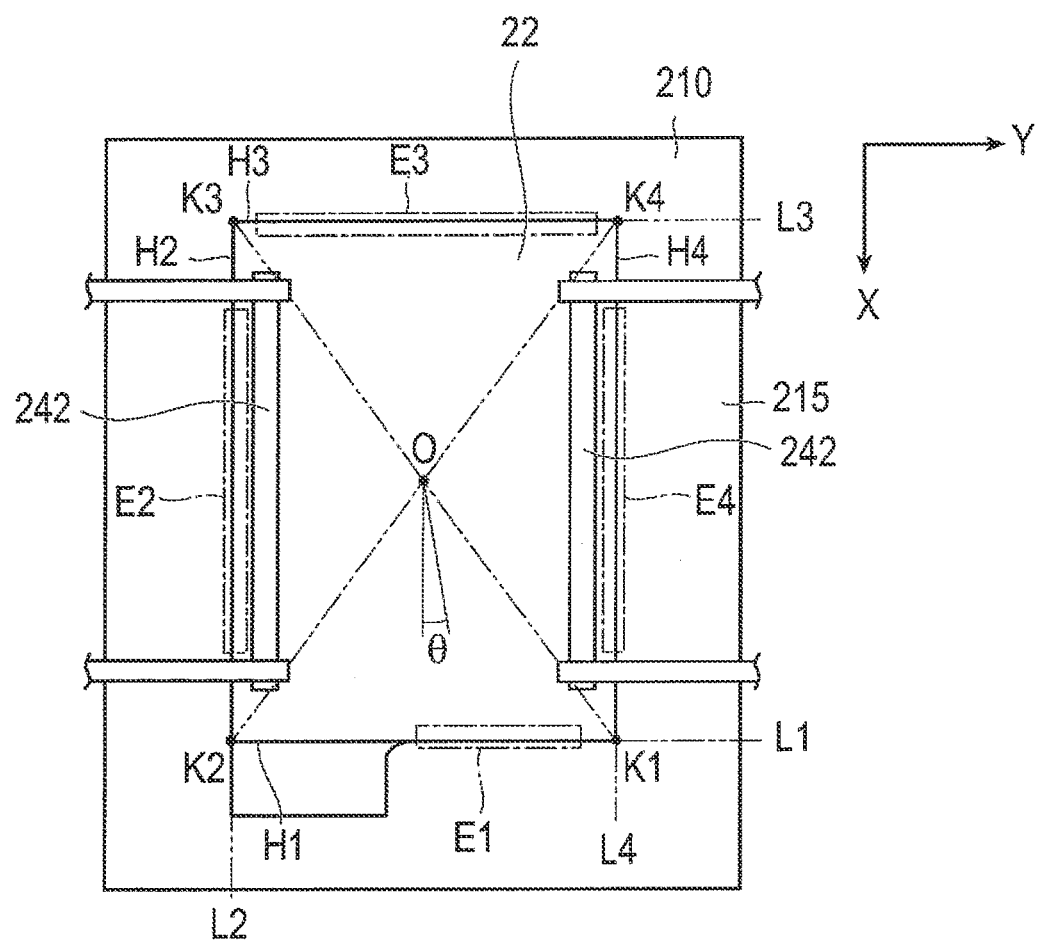
FIG. 9 is a plan view showing the position detection device provided in the stacking device.

As shown in FIGS. 7 to 9, the position detection device 200 includes: a conveyor 210; and a suction conveying unit 220 (position correction unit). The conveyor 210 conveys the positive electrode 22 cut out in the positive electrode cutting unit 100. The suction conveying unit 220 sucks the positive electrode 22 on the conveyor 210, and conveys the positive electrode 22 to the rotary conveying unit 300 (separator conveying unit). Above the conveyor 210, there are provided an imaging camera 230 (position detection unit) and a lighting fixture 231.

The conveyor 210 includes: a suction belt 211, which is formed endlessly and has air permeability; and two rotation shafts 212, which are arranged in line in the conveying direction and rotatably hold the suction belt 211. Moreover, the conveyor 210 includes a negative pressure generation unit 213 arranged in an inside of the suction belt 211.

A plurality of air vacuum holes 214 is formed in the suction belt 211. Then, air is sucked by the negative pressure generation unit 213 through the air vacuum holes 214, whereby it is made possible to hold the positive electrode 22, which is thin and difficult to convey, on a flat installation surface 215 (reference surface) on the conveyor 210, and to convey the positive electrode 22. The installation surface 215 of the suction belt 211 has a color tone by which it is easy for the imaging camera 230 to recognize a boundary thereof with the positive electrode 22, and a color of the installation surface 215 is white in this embodiment.

Note that, in this embodiment, the conveyor 210 is applied as a device including the flat installation surface 215 capable of installing thereon the positive electrode 22 in a substantially horizontal state. However, other devices may be used as long as the flat installation surface is provided in each thereof.

As shown in FIG. 5 and FIG. 8, on both sides of the conveyor 210, a pressing unit 240 is provided, which presses and holds side portions of the positive electrode 22 on the suction belt 211. The pressing unit 240 includes clampers 242, which come close to or are spaced apart from the installation surface 215 (reference surface) on the suction belt 211 by actuators 241 controlled by the control device 500. The clampers 242 are members which correct distortion of the positive electrode 22 by pressing the positive electrode 22 on the installation surface 215. In particular, the positive electrode 22 cut out from the sheet material D wound up in the roll shape is prone to be rounded sine curl is left therein. Moreover, each of the positive electrodes 22, the negative electrodes 30 and the separators 40 is a material with an extremely thin foil shape, and is extremely prone to be deformed in such a large battery as an automotive battery. Note that, though the suction belt 211 is a member that sucks and holds the member brought into contact with the installation surface 215; however, in usual, does not have suction force enough to attract a region apart from the installation surface 215. Accordingly, the positive electrode 22 is thrust against the installation surface 215 by the clampers 242, whereby such deformation of the positive electrode 22 is corrected. In such a way, the imaging camera 230 can be allowed to grasp the position of the positive electrode 22 with high precision, and in addition, a suction position by the suction conveying unit 220 can also be set with high precision. As a result, processing precision in subsequent steps is enhanced.

Then, as shown in FIG. 9, the clampers 242 are formed so as to be capable of pressing long regions which go along two sides H2 and H4 (edges) along the conveying direction of the positive electrode 22 on the suction belt 211. In such a way, the suction position of the positive electrode 22 by the suction conveying unit 220 can be ensured between the clampers 242. Moreover, the clampers 242 can press an inside of edges of four sides H1 to H4, that is, a center side of the positive electrode 22 so that the four sides H1 to H4 (edges) of the positive electrode 22 can be imaged by the imaging camera 230. Note that the clampers 242 are formed of transparent members so that the positive electrode 22 pressed thereby can be imaged through the clampers 242. As the transparent members, for example, acrylic resin, glass and the like can be applied. However, the material of the clampers 242 is not particularly limited, and can be appropriately set in response to a frequency of the lighting fixture 231 and imaging characteristics of the imaging camera 230.

The suction conveying unit 220 includes: a device body 221, which is connected to a drive device (not shown) and is movable; and a suction head 222, which is provided on a lower portion of the device body 221 and exerts suction force by being connected to a negative pressure supply source (not shown). The suction head 222 is movable three-dimensionally along the vertical direction Z, the conveying direction X and the width direction Y in accordance with an operation of the drive device, and further, is made rotatable along a horizontal plane.

The imaging camera 230 provided above the conveyor 210 is a unit that images the positive electrode 22, which is conveyed by the conveyor 210, under light, which is irradiated by the lighting fixture 231, after the positive electrode 22 is pressed and held by the clamper 242. The imaging camera 230 transmits, to the control device 500, a signal that is based on an image of the positive electrode 22 imaged in the event where the positive electrode 22 is conveyed to a predetermined position and stopped there. The control device 500 that has received such a predetermined signal calculates position information, which is the position and state of the positive electrode 22, from the signal concerned, and controls movement of the drive device of the suction conveying unit 220 based a result of the calculated position information. Then, the suction conveying unit 220 appropriately corrects the position and attitude of the positive electrode 22, and conveys the positive electrode 22 concerned to a gap 340 (refer to FIG. 5) of the rotary conveying unit 300 to be described later.

Specifically, the control device 500 stops the conveyor 210 at the predetermined position, and then from the image imaged by the imaging camera 230, detects edges of side areas E1 to E4 corresponding to the four sides of the positive electrode 22 shown in FIG. 9. The edges concerned can be detected from a difference in color tone between the suction belt 211 and the positive electrode 22. From this detection result, the control device 500 calculates approximate straight lines L1 to L4 of the four sides by using the least-squares method. Next, the control device 500 calculates four corner portions K1 to K4, which are intersections between the approximate straight lines L1 to L4 of the four sides, and calculates an average value of the four corner portions K1 to K4, and defines this average value as coordinates of an electrode center point O. Note that the coordinates of the electrode center point O are represented by coordinates in the conveying direction x and the width direction Y. Then, from either one of the approximate straight lines L2 and L4 of the two sides H2 and H4, which go along the conveying direction of the positive electrode 22, or from an average value of both thereof, the control device 500 calculates an inclination angle $\theta$ of the positive electrode 22 on the horizontal plane (reference surface). Thereafter, from the position information, which is the coordinates of the electrode center point O and the inclination angle $\theta$, the control device 500 calculates a correction amount of the position (coordinates and inclination) of the positive electrode 22 on the horizontal plane with respect to a regular position thereof. Then, the control device 500 controls the drive device of the suction conveying unit 220 (position correction unit) to perform correction for this correction amount. Moreover, the suction conveying unit 220 conveys the positive electrode 22 to the gap 340 of the rotary conveying unit 300 while correcting the position of the positive electrode 22.

Note that, in this embodiment, the position and state of the positive electrode 22 is recognized by the imaging camera 230. However, other sensors may also be used, and for example, the position of the positive electrode 22 can also be recognized by a contact sensor that senses a tip end of the positive electrode 22, and the like.

In a state where the positive electrode 22 is conveyed to the predetermined position of the conveyor 210, and the shape of the positive electrode 22 is corrected by pressing the side portions of the positive electrode 22 by the clampers 242, the suction conveying unit 220 goes down vertically, and sucks and holds the positive electrode 22 by the suction head 222. Then, after releasing such restriction of the positive electrode 22 by the clampers 242, the suction conveying unit 220 goes up while maintaining the substantially horizontal state of the positive electrode 22. Thereafter, the suction conveying unit 220 appropriately corrects the position and attitude of the positive electrode 22 in response to the calculated correction amount, and conveys the positive electrode 22 to the gap 340 of the rotary conveying unit 300.

Figure 10:
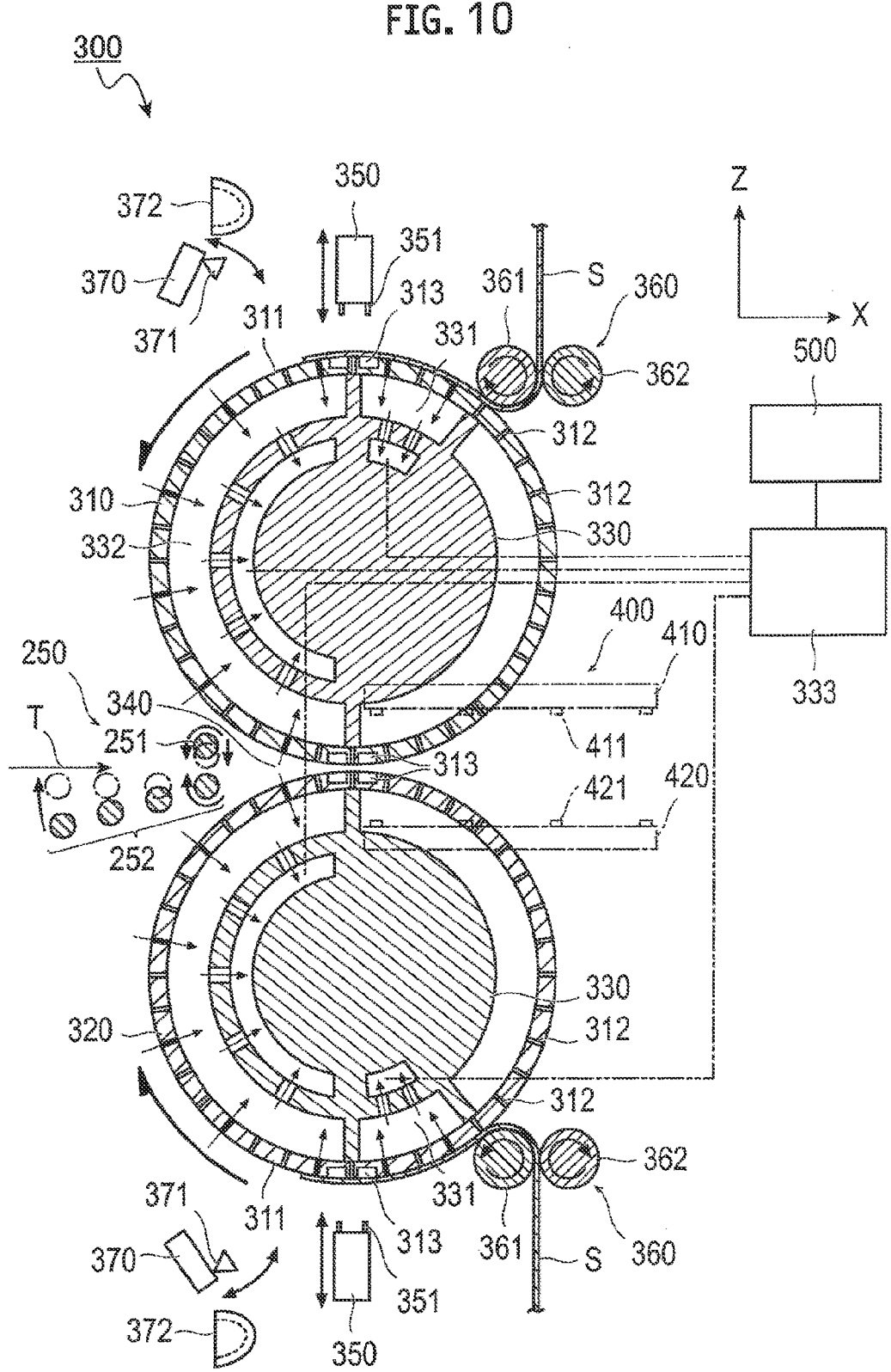
FIG. 10 is a schematic cross-sectional view showing a rotary conveying unit provided in the stacking device.

In the vicinity of the gap 340 of the rotary conveying unit 300, as shown in FIG. 10, there is provided an introduction support unit 250, which is provided so as to sandwich upper and lower portions of the gap 340 thereby, and assists introduction of the positive electrode 22 into the rotary conveying unit 300. The introduction support unit 250 is a unit, which is composed of a plurality of roller groups, supports the positive electrode 22 conveyed by the suction conveying unit 220, and in addition, sends out the positive electrode 22 to the gap 340 of the rotary conveying unit 300.

The introduction support unit 250 includes: an upper introduction support portion 251 composed of one roller; and a lower introduction support portion 252 composed of a plurality of rollers. The upper introduction support portion 251 is movable in the vertical direction Z, and can turn from an "opened state" of moving upward to a "closed state" of going down therefrom and sandwiching the positive electrode 22 with a roller on a most downstream side in the conveying direction in the lower introduction support portion 252. Moreover, the upper introduction support portion 251 drives so as to rotate, and can thereby send out, to the gap 340, the positive electrode 22 sandwiched thereby.

Figure 14:
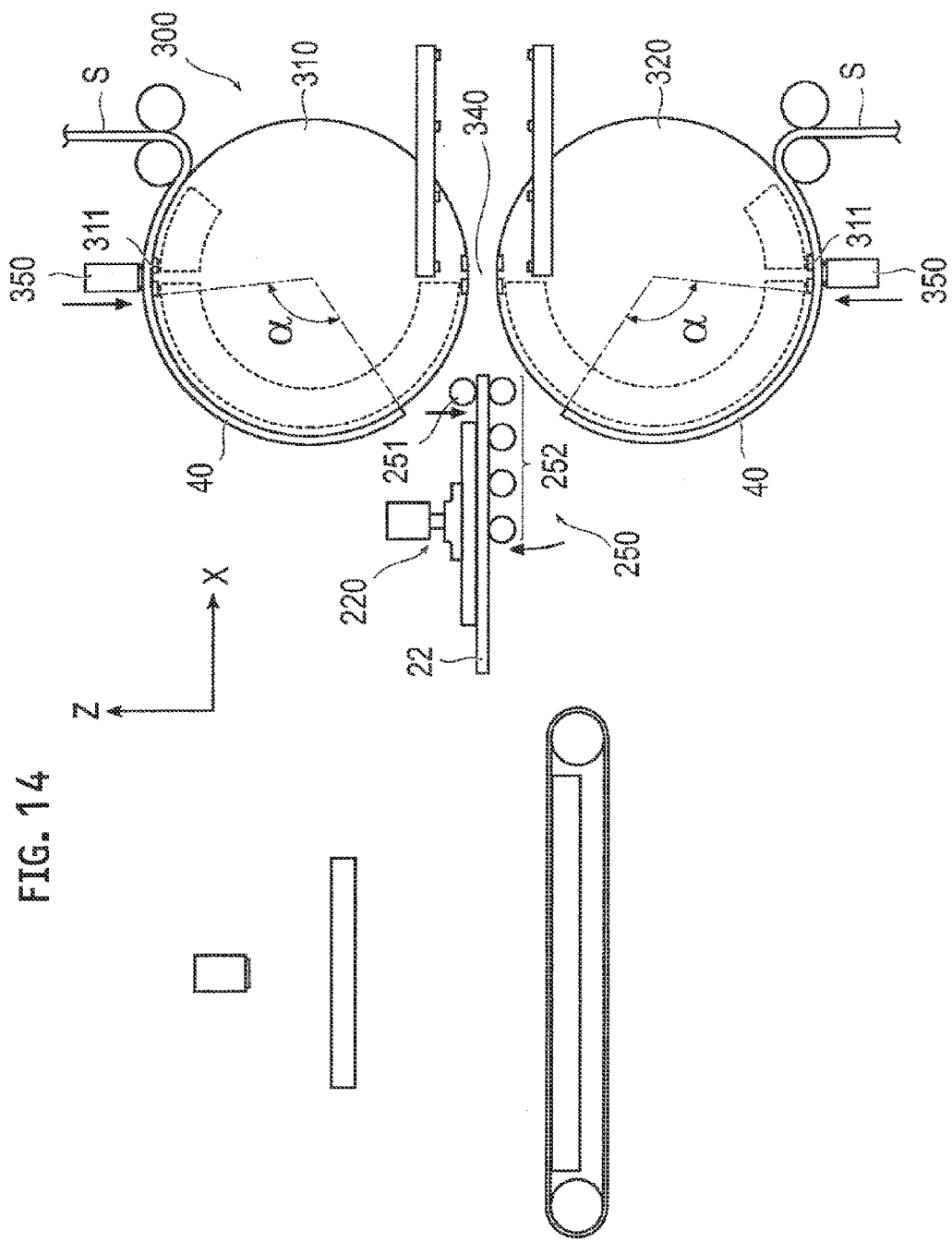
FIG. 14 is a fourth explanatory view showing the stacking process by the stacking device including the position detection device.

The lower introduction support portion 252 turns from an "opened state" where upstream-side rollers thereof in the conveying direction go down obliquely to a "closed state" as a result that the upstream-side rollers in the conveying direction go up and become substantially horizontal in the event where the positive electrode 22 is delivered from the suction conveying unit 220. In such a way, as shown in FIG. 14, the lower introduction support portion 252 supports the positive electrode 22 so as to be conveyable. Such a most downstream-side roller in the conveying direction in the lower introduction support portion 252, the roller making a pair with the roller of the upper introduction support portion 251, is made capable of driving so as to rotate. Therefore, the most downstream-side roller rotates in a state of sandwiching the positive electrode 22 with the upper introduction support portion 251, whereby the positive electrode 22 sandwiched thereby can be sent out to the gap 340.

Hence, when the positive electrode 22 is conveyed by the suction conveying unit 220, the upper introduction support portion 251 is allowed to go down, and is allowed to sandwich the tip end of the positive electrode 22 with the lower introduction support portion 252. Moreover, the rollers of the lower introduction support portion 252 are allowed to go up to be set in the substantially horizontal state, and then support a lower surface of the positive electrode 22. Thereafter, the positive electrode 22 is released from the suction head 222 of the suction conveying unit 220, and the positive electrode 22 is sequentially sent into the gap 340 of the rotary conveying unit 300 by the rotation of the introduction support unit 250.

The rotary conveying unit 300 (separator conveying unit) is a unit that stacks the separator 40 on the positive electrode 22, which is conveyed by the suction conveying unit 220, while cutting out the separator 40 from a sheet-like separator material S. The rotary conveying unit 300 includes a pair of an upper stacking drum 310 (first separator conveying unit, cylindrical rotor) and a lower stacking drum 320 (second separator conveying unit, cylindrical rotor), which are formed into a columnar shape.

In the pair of upper and lower stacking drums 310 and 320, rotation axes thereof are perpendicular to the conveying direction X. Moreover, the stacking drums 310 and 320 are arranged in parallel to each other so that outer circumferential surfaces 311 thereof can be opposite to each other at a predetermined gap 340, and have structures symmetric to each other with respect to the horizontal plane.

On the outer circumferential surfaces 311 of the respective stacking drums 310 and 320, suction portions capable of sucking the separators 40 are formed. Moreover, in insides of the stacking drums 310 and 320, inside structure portions 330 provided so as not to rotate are provided. A width (length in a rotation axis direction) of the stacking drums 310 and 320 is set to an extent where both edges of the separator material S protrude from both ends of the stacking drums 310 and 320.

The upper and lower stacking drums 310 and 320 are arranged through the gap 340. Then, at the gap 340, the stacking drums 310 and 320 rotate toward the downstream side in the conveying direction X. That is to say, the stacking drum 310 located on the upper side rotates counterclockwise on a sheet surface of FIG. 10, and thereby conveys the separator 40, which is sucked onto the outer circumferential surface 311, to the gap 340. Moreover, the stacking drum 320 located on the lower side rotates clockwise on the sheet surface of FIG. 10, and thereby conveys the separator 40, which is sucked onto the outer circumferential surface 311, to the gap 340. Note that the upper and lower stacking drums 310 and 320 are driven by a drive motor (not shown) in which rotation is controlled by the control device 500.

In the stacking drums 310 and 320, on the outer circumferential surfaces 311, a countless number of air vent holes 312 are formed. Moreover, in the outer circumferential surfaces 311, on partial portions thereof in the circumferential direction, recessed portions 313 (receiving portions), which are capable of receiving separator cutters 351 (cutting blades) provided on cutting units 350 to be described later, are formed. The recessed portions 313 are formed at two spots of each of the stacking drums 310 and 320, the spots being spaced apart from each other by 180 degrees. Note that the reason why the recessed portions 313 are provided at two spots in the circumferential direction is in order to cut out two pieces of the separators 40 every time when each of the stacking drums 310 and 320 makes one rotation. However, the number of recessed portions 313 in the circumferential direction can be changed in response to the number of separators 40 to be cut out during one rotation of each of the stacking drums 310 and 320.

Figure 15:
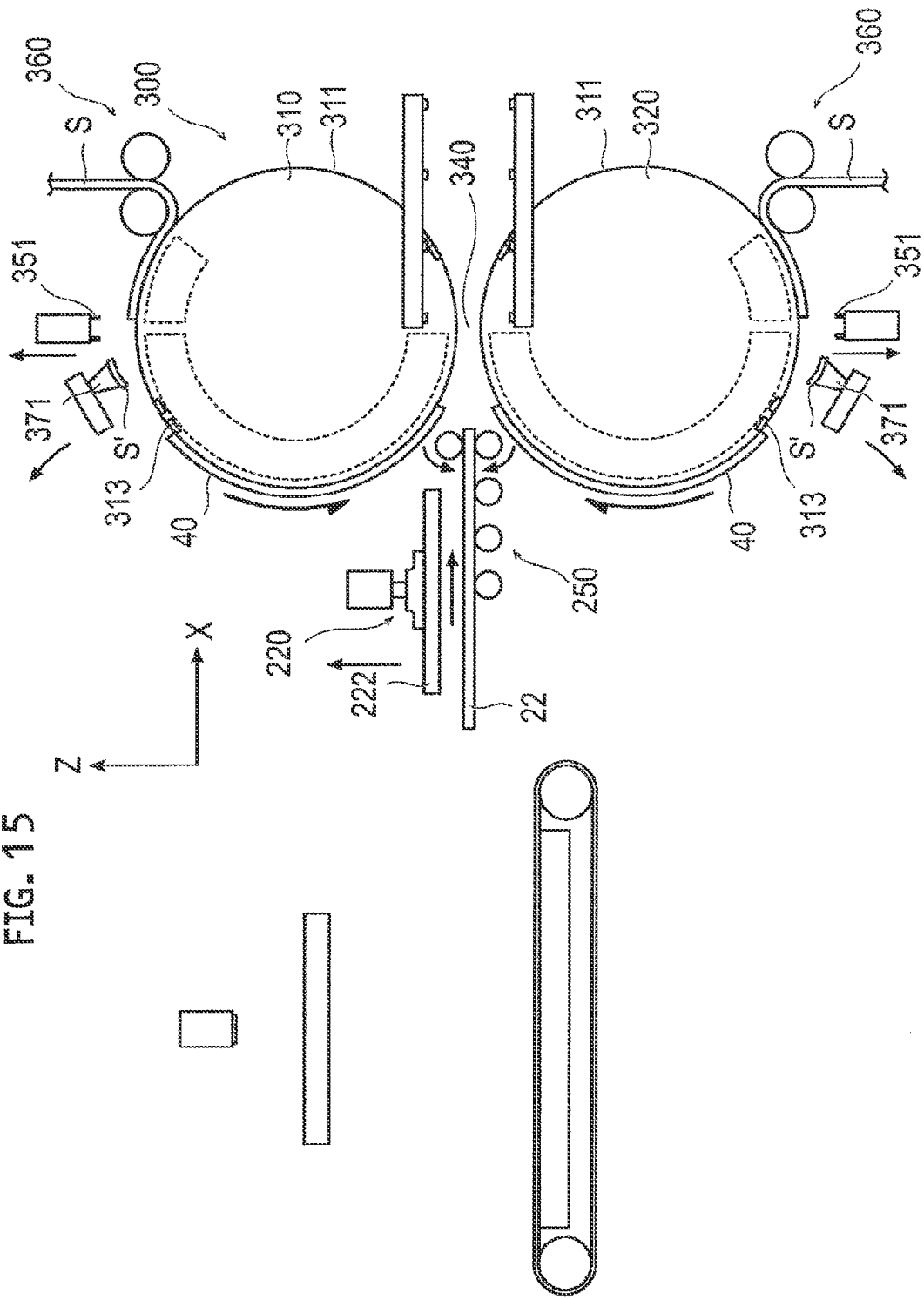
FIG. 15 is a fifth explanatory view showing the stacking process by the stacking device including the position detection device.

Then, on the peripheries of the respective stacking drums 310 and 320, delivery roller units 360 (locking mechanisms), which supply or restrict the sheet-like separator material S, are provided near the outer circumferential surfaces 311. Moreover, the cutting units 350, which cut the separator material S on the outer circumferential surfaces 311 of the stacking drums 310 and 320, are provided. Furthermore, as shown in FIG. 15, cut piece suction units 370 for collecting unnecessary cut pieces S' generated by the cutting by the cutting units 350 are provided.

Specifically, obliquely above and obliquely below on the downstream side in the conveying direction of the rotary conveying unit 300, the small-sized delivery roller units 360 formed into a columnar shape are provided.

In the delivery roller units 360, obliquely above and obliquely below on the downstream side in the conveying direction of the rotary conveying unit 300, pairs of delivery rollers 361 and 362 are provided. The delivery rollers 361 and 362, which make a pair, are formed into a columnar shape, and are arranged through a predetermined gap. Each of the delivery roller units 360 sandwiches, into the gap, one continuous separator material S conveyed from a separator roll (not shown). Then, the delivery roller unit 360 rotates, and thereby sends out the separator material S to the rotary conveying unit 300. Meanwhile, the delivery roller unit 360 stops, and thereby stops such delivery and restricts the separator material S. The delivery rollers 361 and 362 are controlled by the control device 500, and send out the separator material S to the rotary conveying unit 300 at predetermined timing.

The cutting units 350 include the separator cutters 351 individually above and below the rotary conveying unit 300. The separator cutters 351 are heat cutters, which fuse the separator material S sucked onto the outer circumferential surfaces 311 of the stacking drums 310 and 320, and cut the fused separator material S into a predetermined shape. Specifically, first, the separators 40 are sucked onto and conveyed by the outer circumferential surfaces 311 of the stacking drums 310 and 320. In this event, when the recessed portions 313 of the stacking drums 310 and 320 move to positions opposite to the separator cutters 351, the separator cutters 351 move so as to enter the recessed portions 313 of the stacking drums 310 and 320 upon receiving an instruction of the control device 500. In such a way, the separator cutters 351 fuse the separators 40, and cut out the separators 40 into such a predetermined shape as shown in FIG. 3A. In the event of continuously cutting out the separators 40 from the separator material S, a rear end of the separator 40 cut out first is defined as the side 44B on which the engagement portion 43 is formed, and a front end of the separator 40 cut out next is defined as the side 44A. As described above, the two sides 44A and 44B which do not coincide in shape with each other are simultaneously cut out by the cutting units 350, whereby the surplus cut pieces S' are generated.

As shown in FIG. 15, the cut piece suction units 370 include cutter-oriented suction heads 371 which exert the suction force. Then, at timing when the separator cutters 351 come off and are retreated from the recessed portions 313 after cutting the separator material S, the cutter-oriented suction heads 371 move so as to come close to regions thus cut. Thereafter, the cutter-oriented suction heads 371 suck and hold the surplus cut pieces S' of the separators 40 cut out by the separator cutters 351. Then, while sucking and holding the cut pieces S', the cutter-oriented suction heads 371 are spaced apart from the outer circumferential surfaces 311 of the stacking drums 310 and 320. Thereafter, the suction by the cutter-oriented suction heads 371 is stopped to thereby release the cut pieces S', and the cut pieces S' are sucked and collected by suction inlets 372 provided at positions spaced apart from the outer circumferential surfaces 311 of the stacking drums 310 and 320, the suction inlets 372 being provided separately from the stacking drums 310 and 320.

Here, if the cut pieces S' are attempted to be collected only by the suction inlets 372 without using the cutter-oriented suction heads 371, then there is an apprehension that, in such a suction process, the cut pieces S' may be brought into contact with the separators 40 left on the outer circumferential surfaces 311 and with the separator material S. However, the cut pieces S' are collected by the suction inlets 372 after being once sucked and separated from the outer circumferential surfaces 311 by the cutter-oriented suction heads 371, and can be thereby collected while suppressing damage to the separators 40 and the separator material S by the cut pieces S'.

As shown in FIG. 10, in the insides of the respective stacking drums 310 and 320, the inside structure portions 330 are provided. In each of the inside structure portions 330, there are non-rotatably formed: a first negative pressure chamber 331 capable of adjusting strength of a negative pressure in response to the process at the time when the device operates; and a second negative pressure chamber 332 in which the negative pressure is kept substantially constant at the time when the device operates. The first negative pressure chamber 331 and the second negative pressure chamber 332 are connected to a negative pressure supply device 333 provided with a pressure regulating valve, and are capable of adjusting internal pressures thereof in such a manner that the negative pressure supply device 333 is controlled by the control device 500.

The first negative pressure chamber 331 and the second negative pressure chamber 332 are isolated from the outside by an inner circumferential surface of each of the stacking drums 310 and 320. Hence, on the outer circumferential surfaces 311 of the stacking drums 310 and 320, regions of the negative pressure are generated in such a non-rotatable manner through the air vent holes 312 formed in the stacking drums 310 and 320. These regions do not rotate even if the stacking drums 310 and 320 rotate. Such first negative pressure chambers 331 are formed in range from positions, which correspond to the delivery roller units 360, toward the rotation directions of the stacking drums 310 and 320 to positions corresponding to the separator cutters 351. Such second negative pressure chambers 332 are formed in ranges of substantially 180 degrees from positions, which correspond to the separator cutters 351, toward the rotation directions of the stacking drums 310 and 320 to positions corresponding to the gap 340.

Figure 11:
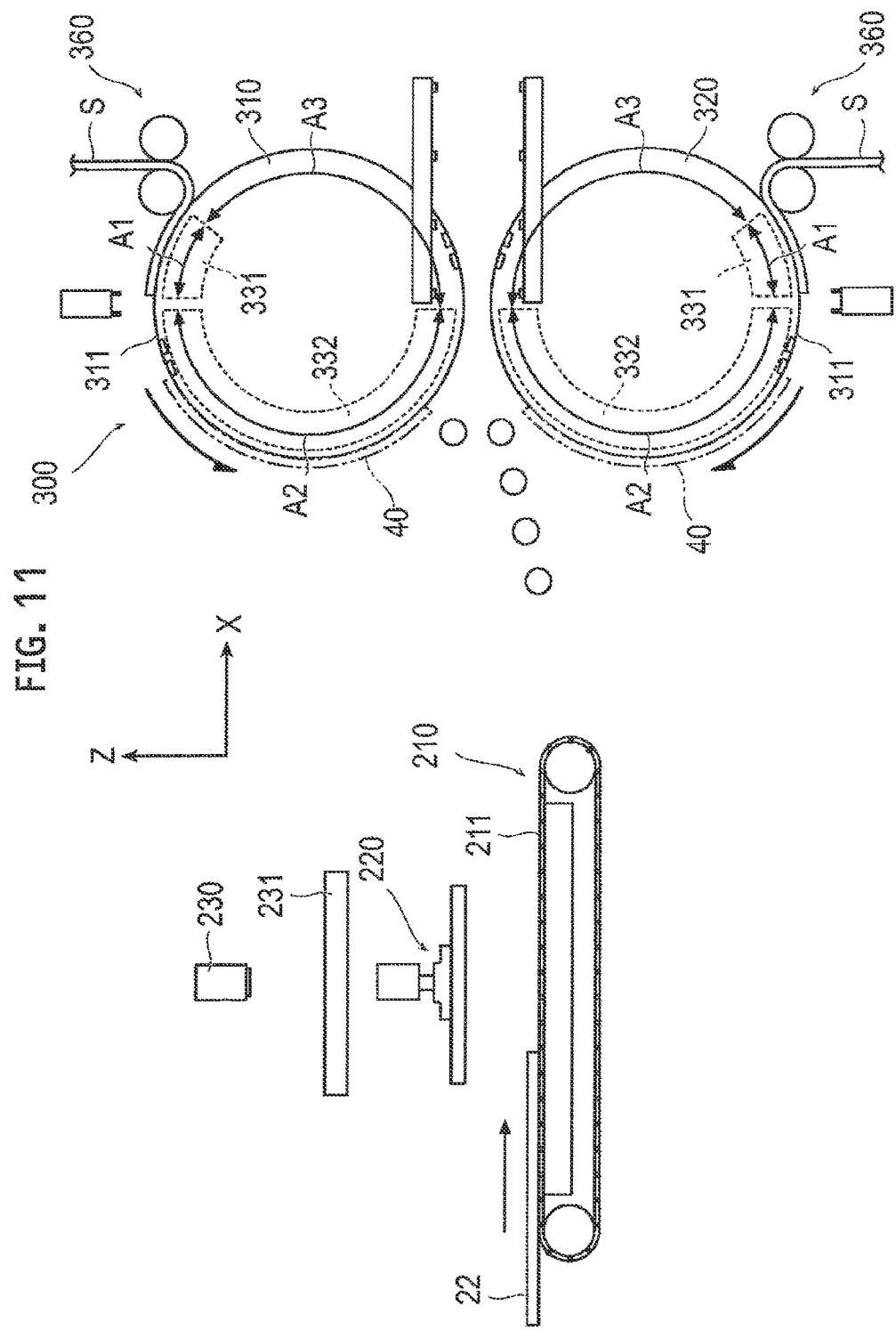
FIG. 11 is a first explanatory view showing a stacking process by the stacking device including a position detection device.

Hence, as shown in FIG. 11, on the outer circumferential surfaces 311 of the stacking drums 310 and 320, slip regions A1 (suction force adjustment regions), in which the negative pressures are adjusted and changed at positions corresponding to the first negative pressure chambers 331, are formed. Moreover, on the outer circumferential surfaces 311, suction regions A2, in which the negative pressures are substantially constant and the separator material S or the cut out separators 40 are sucked and held at positions corresponding to the second negative pressure chambers 332, are formed. The suction regions A2 have strong suction force, can hold the separator material S or the cut out separators 40 by the suction force, and can rotates these along the rotations of the stacking drums 310 and 320. The slip regions A1 can also set therein suction force equivalent to that of the suction regions A2, and can rotate the separators 40. Moreover, while holding the separator material S to an extent where the separator material S concerned is not separated from the outer circumferential surfaces 311, the slip regions A1 lowers the suction force thereof, and can thereby slip the separator material S on the outer circumferential surfaces 311 without rotating the same separator material S in the event where the stacking drums 310 and 320 rotate.

Moreover, in the inside structure portions 330, in ranges thereof from the positions, which correspond to the gap 340, toward the rotation directions of the stacking drums 310 and 320 to the positions corresponding to the delivery roller units 360, either the first negative pressure chambers 331 or the second negative pressure chambers 332 are not provided. Therefore, in regions of the outer circumferential surfaces 311, which correspond to these ranges, non-suction regions A3, which do not suck the separators 40 without generating the negative pressures therein, are non-rotatably formed.

Then, by the stacking drums 310 and 320, the rotary conveying unit 300 sucks and conveys the separators 40 while cutting out the same separators 40. Then, while synchronizing a rotation speed of the stacking drums 310 and 320 and a conveying speed of the positive electrode 22 by the position detection device 200 with each other, the rotary conveying unit 300 sequentially stacks the separators 40 on both sides of the positive electrode 22 from the downstream side in the conveying direction X. At this time, as shown in FIG. 10, the positive electrode 22 is introduced in a tangential direction T of the columnar stacking drums 310 and 320 by the suction conveying unit 220.

The fusing unit 400 is a unit that fuses both edges of the separators 40 stacked on both surfaces of the positive electrode 22 as shown in FIG. 3A. As shown in FIG. 10, this fusing unit 400 includes a pair of upper and lower fusing machines 410 and 420 on both ends of the stacking drums 310 and 320 in the rotation axis direction.

On the upper and lower fusing machines 410 and 420, on surfaces thereof opposite to each other, a plurality of protrusions 411 and 421 are provided along the conveying direction X. Then, the separators 40 are pressurized and heated by the protrusions 411 and 421 opposite to each other, whereby it is made possible to fuse the separators 40 to each other.

The fusing machines 410 and 420 can move in the conveying direction X and the vertical direction Z. That is to say, the fusing machines 410 and 420 come close to each other while moving in the conveying direction X at the same speed as that of the separators 40 so as to synchronize with the separators 40 and the positive electrode 22, which are conveyed to the gap 340 and are stacked on one another there. Then, by the protrusions 411 and 421 opposite to each other, the stacked separators 40 are joined to each other, whereby the joint portions 42 are formed. Thereafter, when the positive electrode 22 packed in a bag made of the separators 40 is conveyed to a predetermined position, the fusing machines 410 and 420 are spaced apart therefrom, and move to the upstream side in the conveying direction. Then, one more time, the fusing machines 410 and 420 come close to each other while moving in the conveying direction X at the same speed as that of the separators 40, and fuse other joint portions 42. After all of the joint portions 42 are joined to each other, the fusing machines 410 and 420 are spaced apart from each other, and the packaged positive electrode 20 thus fabricated is released.

Note that such mutual joining of the separators 40 is not limited to the above-mentioned structure. That is to say, for example, it is also possible to join the separators 40 to each other while heating the separators 40 between a pair of heating rollers which are rotating, to crimp the separators 40 only by pressurization without heating, or to join the separators 40 to each other by using an adhesive.

As shown in FIG. 6, the control device 500 centralizes all of the positive electrode cutting unit 100, the imaging camera 230, the pressing unit 240, the conveyor 210, the suction conveying unit 220, the introduction support unit 250, the delivery roller units 360, the stacking drums 310 and 320, the cutting units 350, the cut piece suction units 370, the negative pressure supply device 333 and the fusing unit 400, and integrally controls all of them. Then, the control device 500 can operate the respective units of FIG. 6 while synchronizing the units concerned with one another. Note that the control device 500 can also control other devices for fabricating the battery together with the above-described units in a centralized manner.

Next, while referring to FIG. 11 to FIG. 19, a description is made of a stacking method using this stacking device.

First, the sheet material D for the positive electrode, which is wound up in the roll shape, is cut by the positive electrode cutting unit 100, and the positive electrode 22 is formed. The positive electrode 22 thus cut out is placed on the installation surface 215 of the conveyor 210, which is provided in the position detection device 200, by an unillustrated suction pad, conveyor or the like. Moreover, each of the delivery roller units 360 sandwiches and restricts, into the gap, one continuous separator material S sent from the separator roll. Hence, as shown in FIG. 11, a tip end of the separator material S is located on an uppermost portion or lowermost portion of the rotary conveying unit 300. Then, in each of the first negative pressure chambers 331, the negative pressure is set low, and the separator material S is not drawn out on the slip region A1 of the outer circumferential surface 311, but the stacking drum 310 or 320 rotates while slipping on the inner surface of the separator material S. Note that, in this embodiment, two separators 40 are cut out during one rotation of the stacking drum 310 or 320, and accordingly, as shown by each chain double-dashed line in FIG. 11, the separator 40 cut out previously is already sucked and conveyed onto the outer circumferential surface 311 of the stacking drum 310 or 320.

Figure 12:
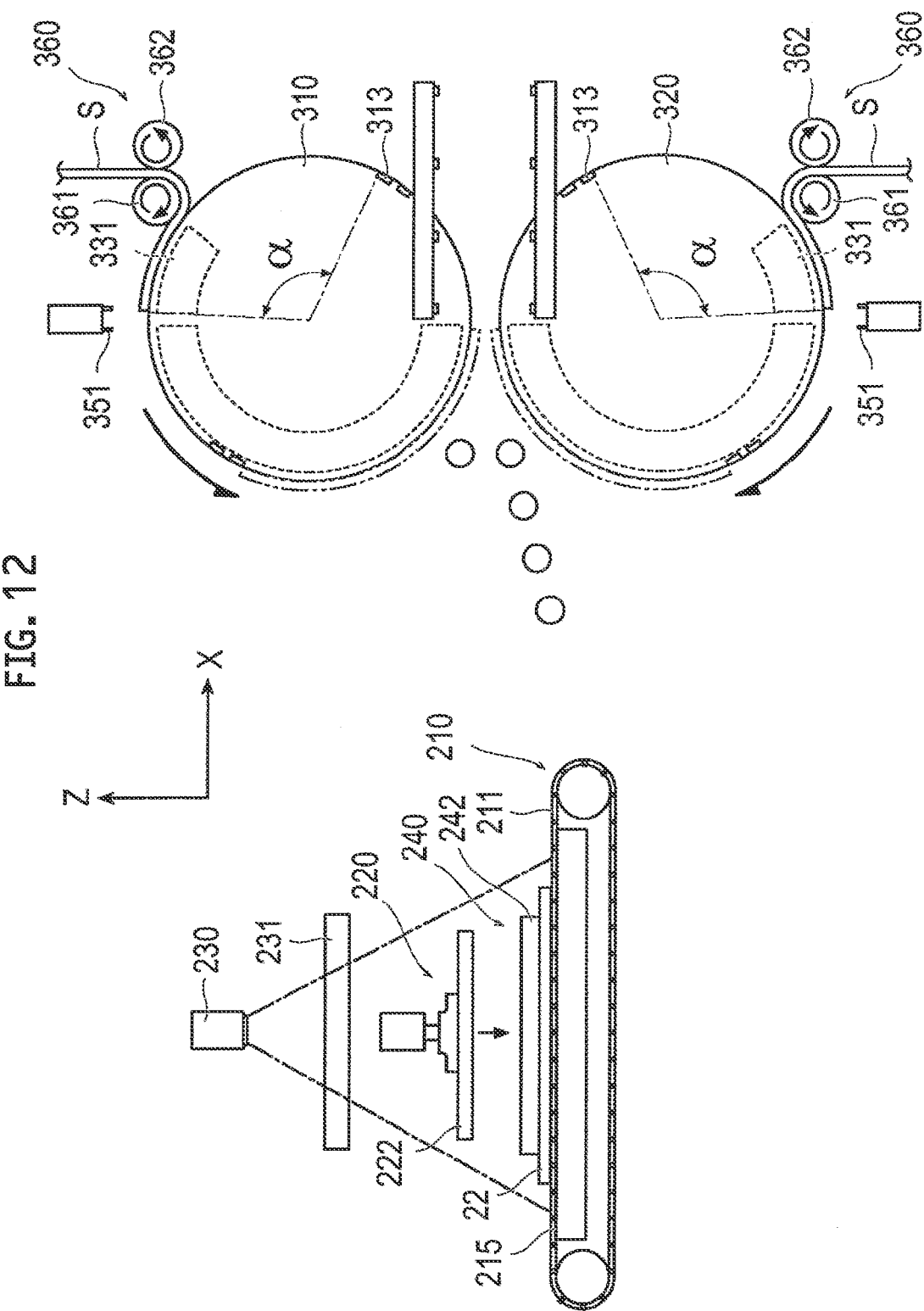
FIG. 12 is a second explanatory view showing the stacking process by the stacking device including the position detection device.

As shown in FIG. 11, the conveyor 210 on which the positive electrode 22 is placed conveys the positive electrode 22, which is located on the installation surface 215 of the suction belt 211, in tandem (array in which the tab is located on the upstream side in the conveying direction X) in line in the conveying direction X. In this event, the positive electrode 22 is sucked by the suction belt 211, and accordingly, an occurrence of a curling-up phenomenon or the like is suppressed. Note that the positive electrode 22 may be conveyed in parallel (array in which the tab is located in the width direction Y). When the suction belt 211 is moved to a predetermined position, the control device 500 stops the movement thereof while keeping a state of sucking the positive electrode 22. Then, as shown in FIG. 12, the pressing unit 240 is actuated, and presses the long regions, which go along the two sides H2 and H4 of the positive electrode 22, by the clampers 242 (refer to FIG. 8 and FIG. 9). In such a way, the deformation such as curling of the positive electrode 22 is corrected. Then, a portion of the positive electrode 22, which has floated from the suction belt 211, approaches the suction belt 211, and is thereby sucked by the suction belt 211, and the positive electrode 22 will be tightly attached onto the installation surface 215.

In this state, the imaging camera 230 images the four sides H1 to H4 of the positive electrode 22, and transmits the predetermined signal to the control device 500. By the above-mentioned method, from the received signal, the control device 500 calculates the coordinates of the electrode center point O and the inclination angle θ, and calculates the correction amounts of the position and inclination with respect to the regular position of the positive electrode 22. Note that, in the event of such imaging, the clampers 242 press the inside (center side of the positive electrode 22) of the edges of the four sides H1 to H4 of the positive electrode 22, and accordingly, the four sides H1 to H4 can be surely imaged by the imaging camera 230. Moreover, the clampers 242 are formed of a transparent material, and accordingly, even if the clampers 242 enter such an imaging range, the positive electrode 22 can be imaged through the clampers 242.

Next, the suction head 222 of the suction conveying unit 220 located above the suction belt 211 is allowed to go down, and the suction head 222 is thrust against the upper surface of the positive electrode 22. In such a way, the positive electrode 22 is sucked to the suction head 222. Note that the positive electrode 22 is also sucked by the suction belt 211. However, the suction force of the suction head 222 is set higher than that of the suction belt 211, or alternatively, the suction by the suction belt 211 is stopped temporarily, whereby the positive electrode 22 can be separated from the suction belt 211 by the suction head 222.

Next, the stacking drums 310 and 320 rotate, and the recessed portions 313 move toward the positions corresponding to the separator cutters 351. In this event, when the recessed portions 313 take a predetermined angle α to the positions of the separator cutters 351, then by the control device 500, the negative pressures of the first negative pressure chambers 331 are increased, and the suction force of the slip regions A1 is strengthened. Moreover, the delivery roller units 360 are rotated, and the separator material S is sequentially sent out while being sandwiched between the pairs of delivery rollers 361 and 362. In such a way, the supply of the separator material S is started for the stacking drums 310 and 320 (refer to T1 of FIG. 19). Then, in the slip regions A1 in which the negative pressures are increased and in the suction regions A2, the separator material S is sucked onto the outer circumferential surfaces 311 of the stacking drums 310 and 320, and the separator material S is sequentially drawn out following the rotations of the stacking drums 310 and 320. Note that the predetermined angle α is an angle corresponding to the length of one piece of the separators 40 to be cut out.

Figure 13:
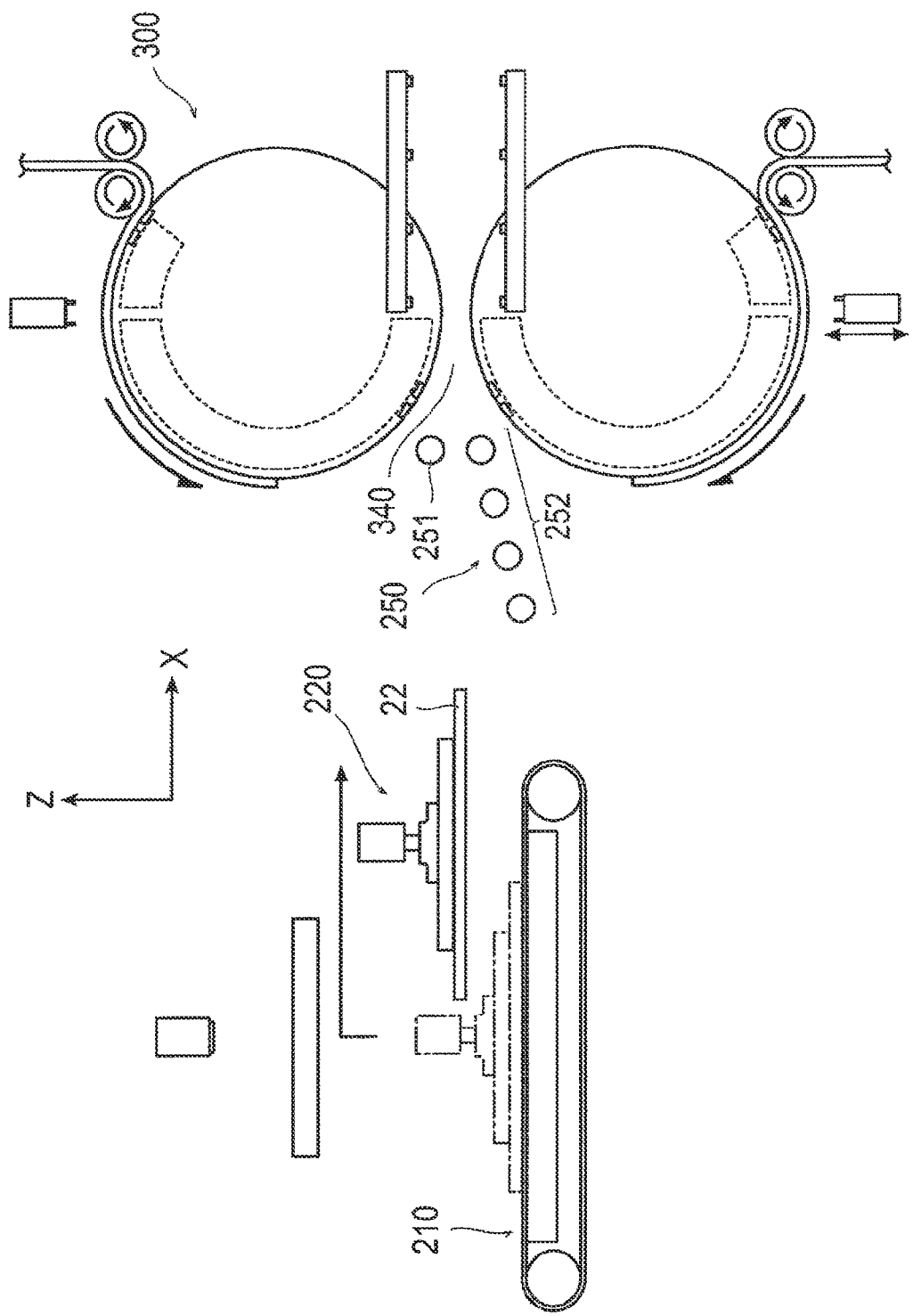
FIG. 13 is a third explanatory view showing the stacking process by the stacking device including the position detection device.

Thereafter, as shown in FIG. 13, the suction conveying unit 220 goes up while maintaining the positive electrode 22 in the substantially horizontal state, thereafter, moves in the conveying direction X, and conveys the positive electrode 22 to the gap 340 of the rotary conveying unit 300. At this time, the suction conveying unit 220 corrects the position and attitude of the positive electrode 22 in such a manner that the drive device thereof is controlled by the control device 500. Specifically, during a period from sucking the positive electrode 22 until delivering the positive electrode 22 to the rotary conveying unit 300, that is, on the way of conveying the positive electrode 22, the suction conveying unit 220 corrects the position and attitude of the positive electrode 22. In such a way, the position of the positive electrode 22 is always maintained with high precision, and the precision of the stacking in the subsequent steps is enhanced.

Then, as shown in FIG. 14, the positive electrode 22 conveyed by the suction conveying unit 220 reaches the introduction support unit 250 in the "opened state", which is provided in front of the gap 340 of the rotary conveying unit 300. Then, the introduction support unit 250 allows the upper introduction support portion 251 to go down, and sandwiches the tip end of the positive electrode 22 with the lower introduction support portion 252. Moreover, the introduction support unit 250 allows the rollers of the lower introduction support portion 252 to go up, turns to the "closed state" by setting the rollers in the substantially horizontal state, and supports the lower surface of the positive electrode 22. Thereafter, the positive electrode 22 is released from the suction head 222 of the suction conveying unit 220, and the positive electrode 22 is sequentially sent into the gap 340 of the rotary conveying unit 300 by the rotation of the introduction support unit 250.

Figure 19:
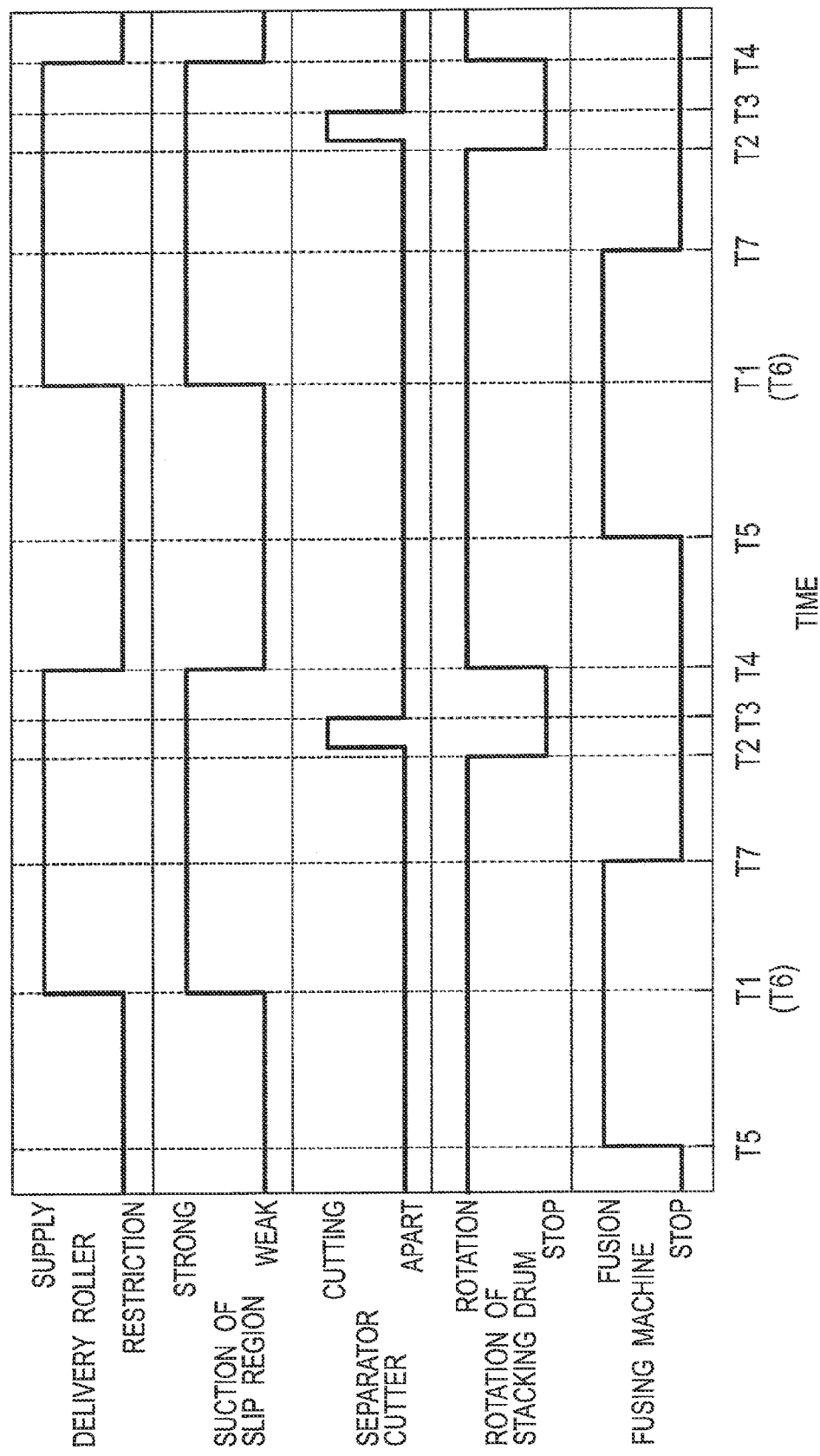
FIG. 19 is a chart showing operations of the rotary conveying unit provided in the stacking device.

Moreover, in the rotary conveying unit 300, when the stacking drums 310 and 320 rotate by the angle α from the start of the rotations, the rotations of the stacking drums 310 and 320 are stopped (refer to T2 of FIG. 19). At this time, the separator material S is drawn out onto the stacking drums 310 and 320 by the angle α corresponding to one piece of the separators 40. Moreover, the recessed portions 313 are located opposite to the separator cutters 351 of the cutting units 350. Then, by the instruction of the control device 500, the separator cutters 351 are thrust against the separator material S, and the separator material S is formed into the predetermined shape, whereby the separators 40 are cut out. The separators 40 thus cut out are located on the suction regions A2 of the stacking drums 310 and 320, which are shown in FIG. 11, and accordingly, are sucked by and held on the stacking drums 310 and 320.

Then, the separator cutters 351 come off and are retreated from the recessed portions 313 after cutting the separator material S. At this timing (refer to T3 of FIG. 19) when the separator cutters 351 are retreated, as shown in FIG. 15, by the instruction of the control device 500, the cutter-oriented suction heads 371 come close to the surplus cut pieces S', suck and hold the same, and thereafter, return to the original positions thereof. Thereafter, the suction by the cutter-oriented suction heads 371 is stopped to thereby release the cut pieces S', and the cut pieces S' are sucked and collected by the suction inlets 372 shown in FIG. 10.

Then, after the positive electrode 22 is released from the suction head 222 of the suction conveying unit 220, the positive electrode 22 is sequentially sent into the gap 340 between the stacking drums 310 and 320 by the rotation of the introduction support unit 250. Moreover, the stacking drums 310 and 320 are rotated one more time (refer to T4 of FIG. 19), and the separators 40 thus cut out are rotated while being left sucked, and are conveyed to the gap 340. Note that, in the event of rotating the stacking drums 310 and 320 one more time, such a state is set, where, by the control device 500, the negative pressures of the first negative pressure chambers 331 are lowered to thereby weaken the suction force of the slip regions A1, and the separator material S is restricted by the delivery roller units 360 (refer to FIG. 18). In such a way, the stacking drums 310 and 320 rotate while slipping on the inner surfaces of the separator material S without allowing the separators 40 to be drawn out on the slip regions A1 of the outer circumferential surfaces 311.

Figure 16:
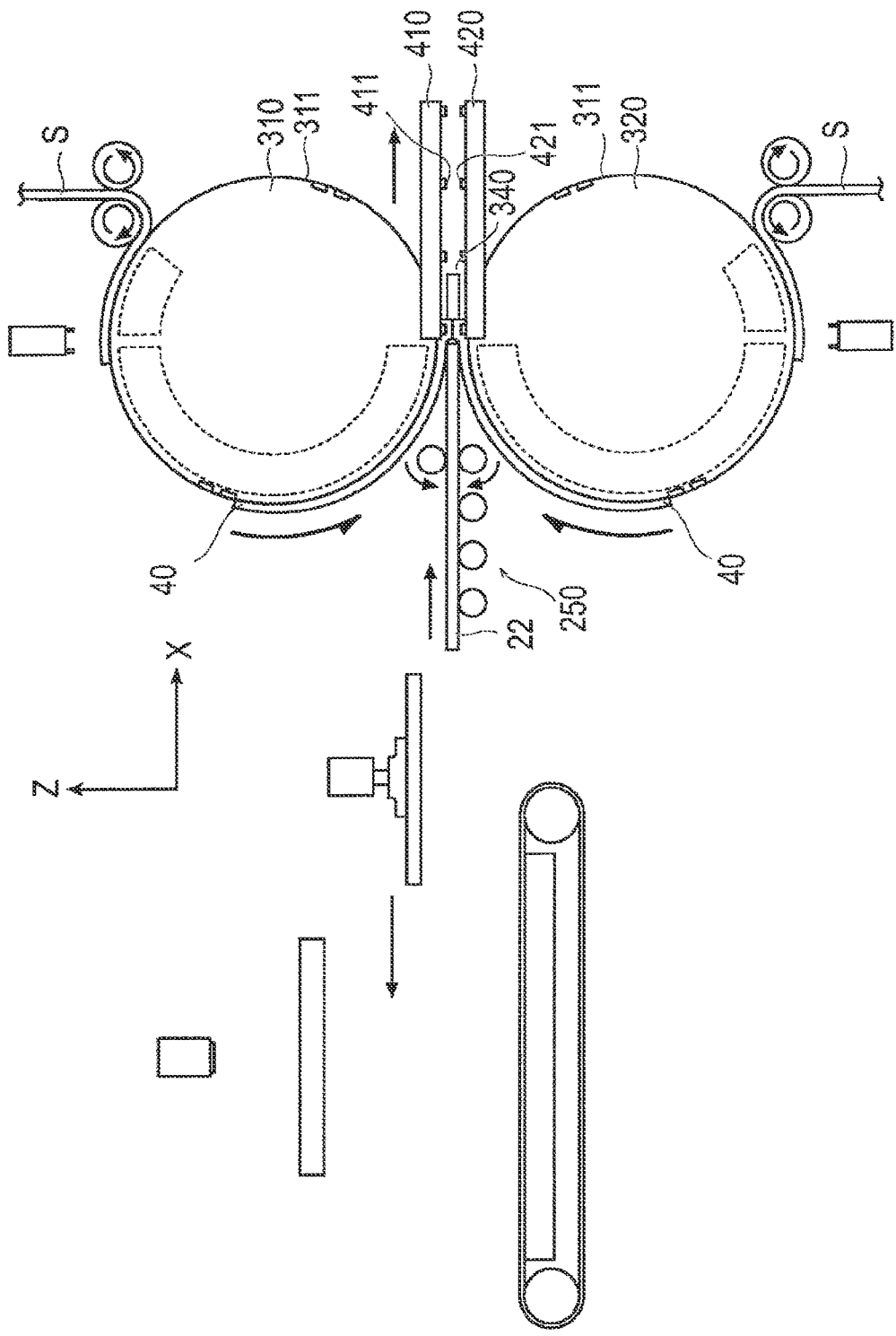
FIG. 16 is a sixth explanatory view showing the stacking process by the stacking device including the position detection device.

When the tip ends of the separators 40 reach the gap 340 of the rotary conveying unit 300, then as shown in FIG. 16, the two separators 40 are first stacked on each other, and thereafter, the separator 40 is stacked on both surfaces of the tip end of the positive electrode 22. At this time, the speed of the separators 40 and the speed of the positive electrode 22 become equal to each other. Moreover, by the control device 500, conveying positions (conveying timing) and conveying speeds of the separators 40 and the positive electrode 22 in the rotary conveying unit 300 and the suction conveying unit 220 are controlled so that the separators 40 and the positive electrode 22 can be stacked on one another at an appropriate position set in advance.

Next, by the instruction of the control device 500, a pair of the fusing machines 410 and 420 move in the conveying direction X while coming close to each other, and sandwich and crimp only tip ends of both edges of the separators 40. Then, while moving the fusing machines 410 and 420 in the conveying direction X of the separators 40 and the positive electrode 22, the tip ends concerned are fused by the protrusions 411 and 421 (refer to T5 of FIG. 19). After passing through the gap 340, the separators 40 reach the non-suction regions A3 of the stacking drums 310 and 320. Therefore, the separators 40 are separated from the outer circumferential surfaces 311 of the stacking drums 310 and 320 without receiving the suction force, and are sequentially discharged in the conveying direction X in a state of sandwiching the positive electrode 22 therebetween. Then, since the tip ends of the separators 40 are already joined to each other, the separators 40 are not separated from each other even if the separators 40 are separated from the outer circumferential surfaces 311 of the stacking drums 310 and 320.

Also thereafter, in synchronization with the stacking drums 310 and 320, the positive electrode 22 is conveyed in the substantially horizontal state in the conveying direction X by the introduction support unit 250. Then, the separators 40 sucked onto the outer circumferential surfaces 311 of the stacking drums 310 and 320 are sequentially stacked on both surfaces of the positive electrode 22 following the rotations of the stacking drums 310 and 320. Note that, at this time, the suction force of the slip regions A1 is strengthened one more time in order to cut out the next separators 40, and the supply of the separator material S by the delivery roller units 360 is started (refer to T6 of FIG. 19).

Figure 17:
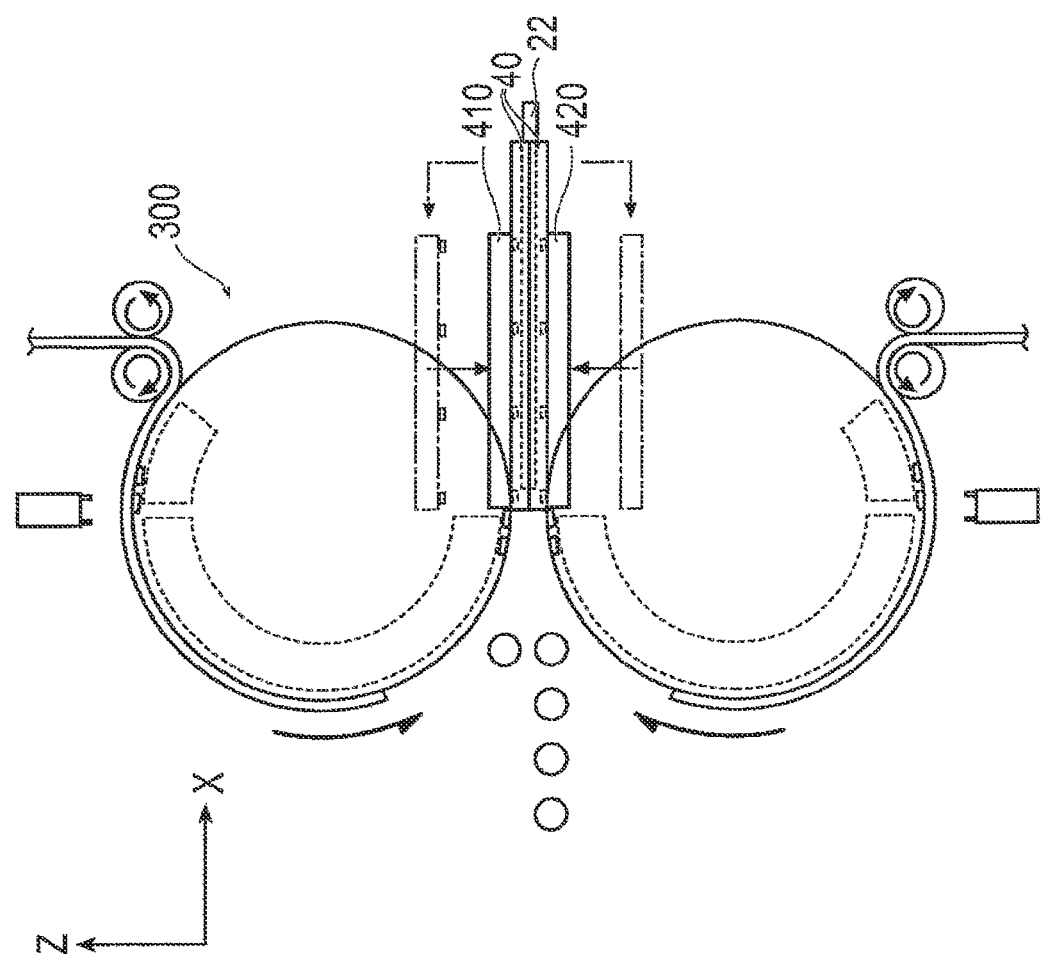
FIG. 17 is a seventh explanatory view showing the stacking process by the stacking device including the position detection device.
Figure 18:
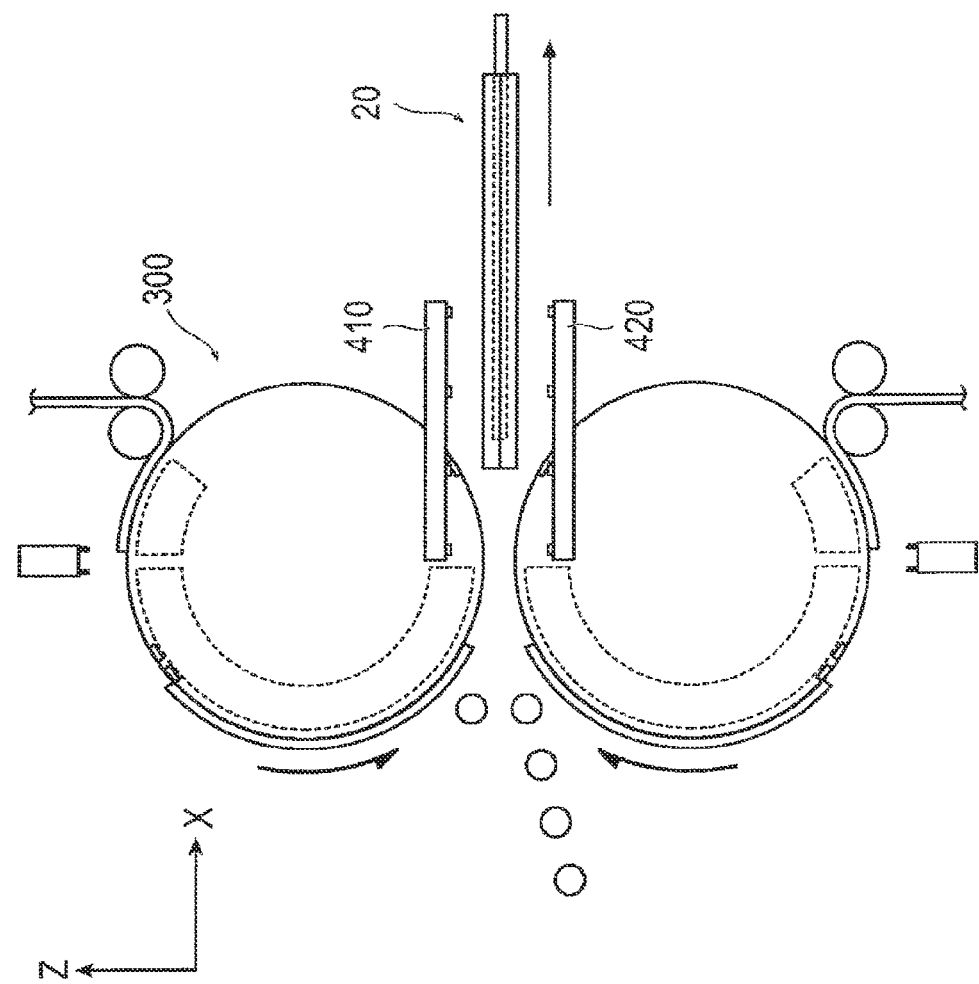
FIG. 18 is an eighth explanatory view showing the stacking process by the stacking device including the position detection device.

Then, after the positive electrode 22 is conveyed to the predetermined position in a state where the separator 40 is stacked on both surfaces of the positive electrode 22 concerned, a pair of the fusing machines 410 and 420 are spaced apart from each other, and are moved to the upstream side in the conveying direction. Thereafter, as shown in FIG. 17, the fusing machines 410 and 420 are allowed to come close to each other while being moved in the conveying direction X one more time, and other joint portions 42 are fused. After all of the joint portions 42 on both edges of the separators 40 are joined to each other, as shown in FIG. 18, the fusing machines 410 and 420 are spaced apart from each other, and the positive electrode 22 is released in a state where the separators 40 are stacked on both surfaces of the same positive electrode 22 (refer to T7 of FIG. 19). Thereafter, the joint portions 42 of the sides 44B of the separators 40 are also joined to each other by other fusing machines (not shown), and the packaged positive electrode 20 is formed.

Note that such packaged positive electrodes 20 can be continuously fabricated by repeating the above-described steps.

The packaged positive electrodes 20 thus fabricated are conveyed to the next steps, are stacked alternately with the negative electrodes 30 to be then formed into the power generation element 15, and finally, the lithium ion secondary battery 10 is manufactured.

In accordance with this embodiment, in a state where the positive electrode 22 (sheet member) is pressed against the flat installation surface 215 (reference surface) by the pressing unit 240, the position of the positive electrode 22 is detected by the imaging camera 230 (position detection unit). Therefore, in a state where the deformation of the positive electrode 22 is corrected, the position of the positive electrode 22 can be detected with high precision. Hence, the detected position of the positive electrode 22 can be used as the position information, for example, necessary for the subsequent conveying step thereof and the step of stacking the positive electrode 22 concerned on the other sheet members (separators 40 and negative electrode 30), and the precision in the subsequent steps is enhanced.

Moreover, the suction conveying unit 220 (position correction unit) is provided, which corrects the position (coordinates of the electrode center point O and inclination angle θ) of the positive electrode 22 based on the position of the positive electrode 22, which is detected by the imaging camera 230 (position detection unit). Therefore, the position of the positive electrode 22 can be corrected to the appropriate position.

Moreover, the pressing unit 240 includes the clampers 242, which are brought into direct contact with the positive electrode 22, and press the positive electrode 22 against the installation surface 215. Therefore, the positive electrode 22 can be surely thrust against the installation surface 215, and the deformation of the positive electrode 22 can be corrected.

Moreover, the pressing unit 240 presses the positions spaced apart from the four sides H1 to H4 (edges) of the positive electrode 22 by a predetermined distance. Therefore, the edges of the positive electrode 22 can be imaged by the imaging camera 230, and the position of the positive electrode 22 can be detected accurately.

Moreover, the clampers 242 are formed of the transparent material. Therefore, even if the clampers 242 enter the imaging range, the position of the positive electrode 22 can be detected through the clampers 242.

Moreover, by being provided on the suction belt 211, the installation surface 215 is provided with the suction force. Therefore, the positive electrode 22 is thrust against the installation surface 215, whereby the positive electrode 22 is sucked to the installation surface 215, both of the thrust force and the suction force act on the positive electrode 22, and the deformation of the positive electrode 22 can be corrected more surely. In such a way, such grasping of the position of the positive electrode 22 by the imaging camera 230 can be performed with high precision. Moreover, the suction position by the suction conveying unit 220 (position correction unit) can also be set with high precision. As a result, the processing precision in the subsequent steps is enhanced.

Note that the present invention is not limited to the above-mentioned embodiment, and is modifiable in various ways.

For example, in the above-described embodiment, as the packaged positive electrode 20, a mode is described, in which the positive electrode 20 is packed into the separators 40. However, a thing to be packed by the above-described stacking device may be the negative electrode 30, and in this case, the position detection device 200 is applied to the negative electrode 30.

Moreover, in this embodiment, the position detection device 200 conveys the positive electrode 22 to the rotary conveying unit 300 for stacking the positive electrode 22 on the separators 40; however, a conveying destination is not limited to this. Hence, a similar configuration to the position detection device 200 can be used for the position detection and conveyance not of the electrodes but of the separators 40.

Moreover, in the above-described embodiment, the description is made of the case where, as shown in FIG. 1, the positive electrode lead 11 and the negative electrode lead 12 are taken out from the same end portion; however, arrangement of the leads is not limited to this. The positive electrode lead 11 and the negative electrode lead 12 may be taken out, for example, from end portions opposite with each other. In this case, in the event of forming the power generation element 15 of the lithium ion secondary battery 10, the negative electrode 30 and the packaged positive electrode 20 are stacked on each other so that the positive electrode tab 23 and the negative electrode tab 33 can be directed in reverse directions to each other.

Moreover, in the position detection device 200, the positive electrode 22 is conveyed in the substantially horizontal state; however, may be conveyed in other directions.

Moreover, the introduction support unit 250 is composed entirely of the rollers; however, may be composed of other members such as flat members.

Moreover, in this embodiment, the positive electrode cutting unit 100, the imaging camera 230, the pressing unit 240, the conveyor 210, the suction conveying unit 220, the introduction support unit 250, the delivery roller units 360, the stacking drums 310 and 320, the cutting units 350, the cut piece suction units 370, the negative pressure supply device 333 and the fusing unit 400 are synchronized with one another by the control device 500 (synchronization device). However, it is not always necessary that all of the above-described units be electrically synchronized with one another, and for example, at least a part thereof may be mechanically linked and synchronized with one another.

Moreover, in this embodiment, the clampers 242 of the pressing unit 240 are brought into direct contact with the positive electrode 22. However, for example, the clampers may come close to the positive electrode 22 through a gap, and may press the positive electrode 22 by gas blown out from the clampers concerned. In such a way, the clampers are not brought into direct contact with the positive electrode 22, and accordingly, damage of the positive electrode 22 can be suppressed.

Moreover, in this embodiment, the description is made of the mode in which the position of the positive electrode 22 is corrected on the way of conveying the positive electrode 22 by the suction conveying unit 220. However, the step of correcting the position of the positive electrode 22 by using the detected position information and the configuration of the position correction unit are not limited to this case. For example, besides on the way of conveying the positive electrode 22, the position of the positive electrode 22 can be corrected at the time of sucking and lifting up the positive electrode 22, at the time of allowing the positive electrode 22 to go down, or after releasing the suction of the positive electrode 22. At the time of sucking and lifting up the positive electrode 22, the position of the positive electrode 22 can be corrected by adjusting the position and attitude of the suction conveying unit 220 or adjusting the position and attitude of the conveyor 210. At the time of allowing the positive electrode 22 to go down, the position of the positive electrode 22 can be corrected by adjusting the position and attitude of the suction conveying unit 220 or adjusting the position and attitude of the introduction support unit 250. After releasing the suction of the positive electrode 22, the position of the positive electrode 22 can be corrected by adjusting the position and attitude of the introduction support unit 250.

The entire contents of Japanese Patent Application No. 2011-085731 (filed on Apr. 7, 2011) and Japanese Patent Application No. 2012-067805 (filed on Mar. 23, 2012) are incorporated herein by reference.

The description has been made above of the contents of the present invention along the embodiment; however, it is self-obvious for those skilled in the art that the present invention is not limited to the description of these, and that varieties of modifications and improvements are possible.

INDUSTRIAL APPLICABILITY

In accordance with the position detection device and position detection method of the present invention, the position of the sheet member is detected in a state where the sheet member is pressed against the flat reference surface, and this is used as the position information of the sheet member in the subsequent steps. Therefore, the position of the sheet member can be detected with high precision in a state where the deformation of the sheet member is corrected, and for example, in the subsequent conveying step and the subsequent step of stacking the sheet member on other sheet members, the precision of the steps is enhanced.

REFERENCE SIGNS LIST

10 LITHIUM ION SECONDARY BATTERY
20 PACKAGED POSITIVE ELECTRODE
22 POSITIVE ELECTRODE (SHEET MEMBER)
30 NEGATIVE ELECTRODE
40 SEPARATOR
200 POSITION DETECTION DEVICE
210 CONVEYOR
211 SUCTION BELT
215 INSTALLATION SURFACE (REFERENCE SURFACE)
220 SUCTION CONVEYING UNIT (POSITION CORRECTION UNIT)
230 IMAGING CAMERA (POSITION DETECTION UNIT)
240 PRESSING UNIT
242 CLAMPER
500 CONTROL DEVICE
D SHEET MATERIAL
H1 to H4 SIDE (EDGE)

The invention claimed is:

1. A position detection device comprising:
a pressing unit that presses a sheet member against a flat reference surface, the sheet member being cut out from a sheet material wound up in a roll shape, and composing a battery element; and
a position detection unit that detects a position of the sheet member pressed against the reference surface by the pressing unit,
wherein the position of the sheet member, which is detected by the position detection unit, is used as position information of the sheet member in a subsequent step.

2. The position detection device according to claim 1, further comprising:
a position correction unit that corrects the position of the sheet member by using the position information of the sheet member.

3. The position detection device according to claim 1, wherein the pressing unit comprises a clamper that is brought into direct contact with the sheet member and presses the sheet member against the reference surface.

4. The position detection device according to claim 1, wherein the pressing unit presses a position spaced apart from an edge of the sheet member by a predetermined distance.

5. The position detection device according to claim 1, wherein the pressing unit is formed of a transparent material.

6. The position detection device according to claim 1, wherein the reference surface has suction force.

7. A position detection method comprising:
pressing a sheet member against a flat reference surface, the sheet member being cut out from a sheet material wound up in a roll shape, and composing a battery element; and
detecting a position of the sheet member pressed against the reference surface,
wherein the detected position of the sheet member is used as position information of the sheet member in a subsequent step.

8. The position detection method according to claim 7, further comprising:
correcting the position of the sheet member by using the position information of the sheet member.

9. The position detection method according to claim 7, wherein pressing the sheet member against the reference surface comprises pressing the sheet member with a pressing unit that is brought into direct contact with the sheet member.

10. The position detection method according to claim 7, wherein pressing the sheet member against the reference surface comprises pressing a position spaced apart from an edge of the sheet member by a predetermined distance with a pressing unit.

11. The position detection method according to claim 7, wherein pressing the sheet member against the reference surface comprises pressing the sheet member with a pressing unit formed of a transparent material.

12. The position detection method according to claim 7, wherein pressing the sheet member against the reference surface comprises pressing the sheet member with a pressing unit against the reference surface having suction force.

13. A position detection device comprising:
pressing means for pressing a sheet member against a flat reference surface, the sheet member being cut out from a sheet material wound up in a roll shape, and composing a battery element; and
position detection means for detecting a position of the sheet member pressed against the reference surface by the pressing means,
wherein the position of the sheet member, which is detected by the position detection means, is used as position information of the sheet member in a subsequent step.

* * * * *